United States Patent
Choi et al.

(10) Patent No.: US 9,298,029 B2
(45) Date of Patent: Mar. 29, 2016

(54) DISPLAY APPARATUS AND METHOD OF MANUFACTURING THE SAME

(71) Applicant: SAMSUNG DISPLAY CO., LTD., Yongin, Gyeonggi-Do (KR)

(72) Inventors: Sanggun Choi, Suwon-si (KR); Ha-Young Park, Uijeongbu-si (KR); Sehee Han, Seoul (KR); Hansu Kim, Seoul (KR); Aram Lee, Hwaseong-si (KR); Seung-Yeon Chae, Hwaseong-si (KR); Taewoon Cha, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/337,403

(22) Filed: Jul. 22, 2014

(65) Prior Publication Data

US 2015/0185517 A1 Jul. 2, 2015

(30) Foreign Application Priority Data

Dec. 27, 2013 (KR) ........................ 10-2013-0165558

(51) Int. Cl.
*G02F 1/1333* (2006.01)
*G02F 1/1335* (2006.01)
*G02F 1/1345* (2006.01)
*G02F 1/1362* (2006.01)

(52) U.S. Cl.
CPC ........ *G02F 1/133377* (2013.01); *G02F 1/1345* (2013.01); *G02F 1/133512* (2013.01); *G02F 1/136209* (2013.01); *G02F 2001/136222* (2013.01)

(58) Field of Classification Search
CPC ............ G02F 1/133512; G02F 1/1345; G02F 1/133377
See application file for complete search history.

(56) References Cited

U.S. PATENT DOCUMENTS

| 2010/0097538 A1 | 4/2010 | Ota |
| 2011/0221989 A1 | 9/2011 | Lee et al. |
| 2012/0092599 A1 | 4/2012 | Lee et al. |
| 2013/0093985 A1* | 4/2013 | Kang ................ G02F 1/133377 349/106 |

FOREIGN PATENT DOCUMENTS

| JP | 05-134106 A | 5/1993 |
| JP | 2001-117082 A | 4/2001 |
| JP | 2003-149630 A | 5/2003 |
| KR | 10-2007-0021490 A | 2/2003 |
| KR | 10-2006-0082627 A | 7/2006 |
| KR | 10-2008-0074242 A | 8/2008 |

* cited by examiner

*Primary Examiner* — James Dudek
(74) *Attorney, Agent, or Firm* — Lee & Morse, P.C.

(57) ABSTRACT

A display apparatus includes a substrate that includes a plurality of pixel areas, a display area including first and second non-pixel areas extending to cross each other, and a non-display area adjacent to the display area, a plurality of first electrodes on the substrate in the pixel areas, a plurality of second electrodes extending in a first direction and upwardly spaced apart from the substrate in the pixel areas to form first tunnel-shaped cavities, an image display area in each of the first tunnel-shaped cavities, and a plurality of dummy electrodes in first cross areas defined by an intersection of the first and second non-pixel areas adjacent to boundaries of the display area in the first direction. The dummy electrodes are upwardly spaced apart from the substrate in the first cross areas by a predetermined distance to form dummy tunnel-shaped cavities.

20 Claims, 34 Drawing Sheets

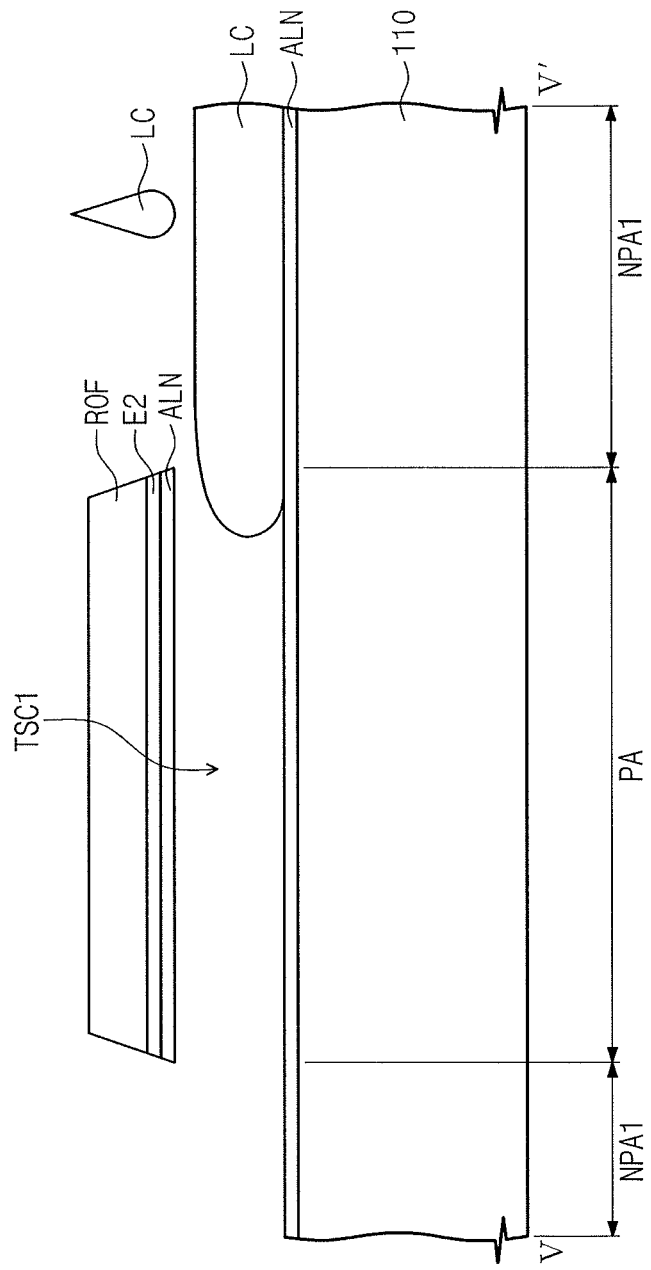

DISPLAY APPARATUS AND METHOD OF MANUFACTURING THE SAME

CROSS-REFERENCE TO RELATED APPLICATION

Korean Patent Application No. 10-2013-0165558, filed on Dec. 27, 2013, in the Korean Intellectual Property Office, and entitled: "Display Apparatus and Method of Manufacturing the Same," is incorporated by reference herein in its entirety.

BACKGROUND

1. Field

Embodiments relate to a display apparatus and a method of manufacturing the display apparatus.

2. Description of the Related Art

In recent years, various display devices, such as a liquid crystal display device, an organic light emitting display device, an electrowetting display device, an electrophoretic display device, etc., have been developed.

In general, a display device includes pixels to display an image. The pixels receive data signals in response to gate signals and display gray scales corresponding to the data signals.

The display device includes two substrates and an image display layer interposed between the two substrates. The image display layer may be a liquid crystal layer, an electrowetting layer, or an electrophoretic layer.

SUMMARY

Embodiments are directed to a display apparatus including a substrate that includes a plurality of pixel areas, a display area including first and second non-pixel areas extending to cross each other, and a non-display area adjacent to the display area, a plurality of first electrodes on the substrate in the pixel areas, a plurality of second electrodes extending in a first direction and upwardly spaced apart from the substrate in the pixel areas to form first tunnel-shaped cavities, an image display area in each of the first tunnel-shaped cavities, and a plurality of dummy electrodes in first cross areas defined by an intersection of the first and second non-pixel areas adjacent to boundaries of the display area in the first direction, the dummy electrodes being upwardly spaced apart from the substrate in the first cross areas by a predetermined distance to form dummy tunnel-shaped cavities.

The first non-pixel area may extend in the first direction. The second non-pixel area may extend in a second direction crossing the first direction. The dummy electrodes may be between the second electrodes in the second non-pixel area adjacent to the non-display area and connected to the second electrodes.

Each of the dummy electrodes may include a first dummy electrode adjacent to the non-display area and upwardly spaced apart from the substrate by a first height and a second dummy electrode connected to the first dummy electrode and upwardly spaced apart from the substrate by a second height higher than the first height, one end of the first dummy electrode being adjacent to the non-display area in the first direction, and the other end of the first dummy electrode being connected to the second dummy electrode.

Each of the dummy tunnel-shaped cavities may include a first area between the first dummy electrode and the substrate, and a second area between the second dummy electrode and the substrate.

The display apparatus may further include an alignment layer on an inner surface of the first and second dummy electrodes and on the substrate in the dummy tunnel-shaped cavities, the alignment layer sealing the dummy tunnel-shaped cavity of the first area.

The non-display area may include a plurality of dummy pixel areas. The second electrodes may extend in the non-display area and may be upwardly spaced apart from the substrate by a predetermined distance in the dummy pixel areas to form second tunnel-shaped cavities.

The display apparatus may further include an alignment layer on an inner surface of the second electrodes and on the substrate to cover the first electrodes in the first tunnel-shaped cavities, and on the inner surface of the second electrodes and on the substrate in the second tunnel-shaped cavities.

The display apparatus may further include a roof layer on the second electrodes and the dummy electrodes, the roof layer being planarized, and a sealing layer on the roof layer and covering the substrate, the sealing layer sealing the first tunnel-shaped cavities, the dummy tunnel-shaped cavities, and the second tunnel-shaped cavities.

The substrate in the display area may include a thin film transistor connected to the first electrode, a color filter in each of the pixel areas, and a black matrix in the first and second non-pixel areas.

The substrate in the non-display area may include a black matrix.

The image display layer may be a liquid crystal layer.

Embodiments are also directed to a method of manufacturing a display apparatus including preparing a substrate that includes a display area including a plurality of pixel areas, and first and second non-pixel areas that respectively extend in a first direction and a second direction to cross each other, and a non-display area disposed adjacent to the display area, the non-display are including a plurality of dummy pixel areas, forming a plurality of first electrodes on the substrate in the pixel areas, forming a sacrificial layer that extends in the second direction crossing the first direction to overlap with the pixel areas and the dummy pixel areas, in first cross areas of the first and second non-pixel areas adjacent to boundaries of the display area in the first direction, forming a plurality of second electrodes extending in the first direction to cover the sacrificial layer in the pixel areas and the dummy pixel areas, forming a plurality of dummy electrodes on the sacrificial layer in the first cross areas, forming a roof layer on the second electrodes and the dummy electrodes, wet-etching the sacrificial layer to form first tunnel-shaped cavities between the second electrode and the substrate in the pixel areas, to form dummy tunnel-shaped cavities between the dummy electrode and the substrate, and to form second tunnel-shaped cavities between the second electrode and the substrate in the dummy pixel areas, and providing a liquid crystal layer in the first tunnel-shaped cavities.

The first non-pixel area may extend in the first direction. The second non-pixel area may extend in a second direction crossing the first direction. The dummy electrodes may be disposed between the second electrodes in the second non-pixel area adjacent to the non-display area and connected to the second electrodes.

The method may further include providing an alignment liquid to the first and second tunnel-shaped cavities on the substrate and drying the alignment liquid to form an alignment layer in the first and second tunnel-shaped cavities.

Each of the dummy electrodes may include a first dummy electrode disposed adjacent to the non-display area and upwardly spaced apart from the substrate with a first height, and a second dummy electrode connected to the first dummy electrode and upwardly spaced apart from the substrate with a second height higher than the first height, one end of the first dummy electrode being disposed adjacent to the non-display area in the first direction, and the other end of the first dummy electrode being connected to the second dummy electrode.

Each of the dummy tunnel-shaped cavities may include a first area disposed between the first dummy electrode and the substrate, and a second area disposed between the second dummy electrode and the substrate.

The method may further include providing an alignment liquid to the first dummy tunnel-shaped cavities, and drying the alignment liquid to form an alignment layer in the first dummy tunnel-shaped cavities, wherein the alignment layer is lumped together to seal the first dummy tunnel-shaped cavity of each of the first areas.

The method may further include forming a roof layer on the second electrodes and the dummy electrodes, and forming a sealing layer on the roof layer to cover the substrate and to seal the first tunnel-shaped cavities, the dummy tunnel-shaped cavities, and the second tunnel-shaped cavities.

Forming the liquid crystal layer may include providing a liquid crystal in fluid state to the first non-pixel area, providing the liquid crystal to the first tunnel-shaped cavities using a capillary phenomenon, and removing the liquid crystal from the first non-pixel area.

The substrate may include a thin film transistor connected to the first electrode, a color filter disposed in each of the pixel areas, and a black matrix disposed in the first and second non-pixel areas and the non-display area.

BRIEF DESCRIPTION OF THE DRAWINGS

Features will become apparent to those of skill in the art by describing in detail exemplary embodiments with reference to the attached drawings in which:

FIGS. 16A, 16B, 16C, and 16D illustrate views showing a method of forming a liquid crystal layer in the first tunnel-shaped cavity.

DETAILED DESCRIPTION

Figure 1:
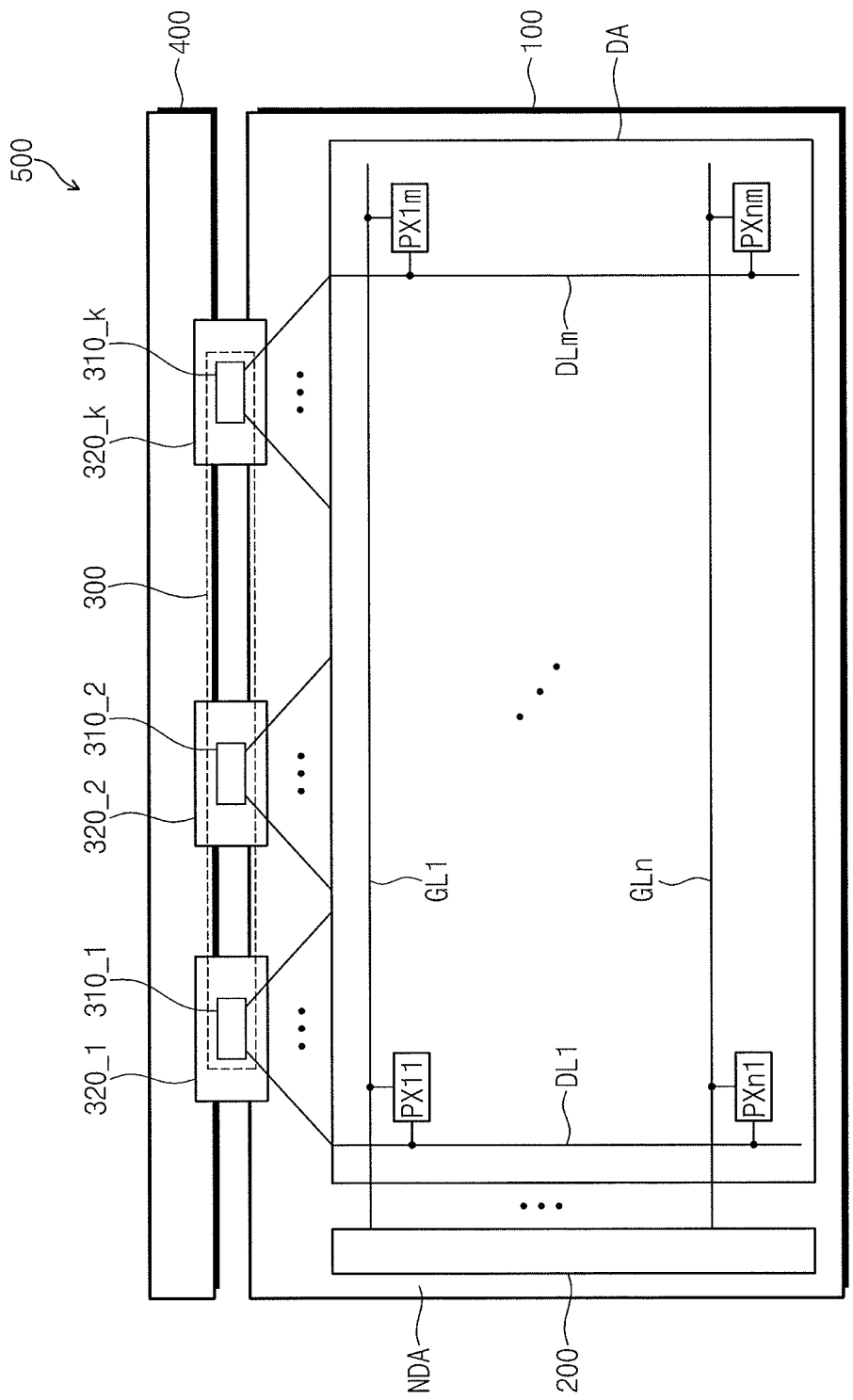
FIG. 1 illustrates a plan view showing a display apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It is to be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting thereof. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a plan view showing a display apparatus according to an exemplary embodiment.

Referring to FIG. 1, a display apparatus 500 may include a display panel 100, a gate driver 200, a data driver 300, and a driving circuit board 400.

The display panel 100 may include a plurality of pixels PX11 to PXnm, a plurality of gate lines GL1 to GLn, and a plurality of data lines DL1 to DLm. Each of "m" and "n" is an integer number greater than zero (0). The display panel 100 may include a display area DA and a non-display area NDA surrounding the display area DA when viewed in a plan view.

A plurality of dummy pixels may be arranged in the non-display area NDA. The dummy pixels will be described in detail with reference to FIGS. 2 and 3.

The pixels PX11 to PXnm may be disposed in the display area DA and arranged in a matrix form. The data lines DL1 to DLm may be insulated from the gate lines GL1 to GLn while crossing the gate lines GL1 to GLn and may be connected to the pixels PX11 and PXnm.

The gate lines GL1 to GLn may extend in a row direction and may be connected to the gate driver 200. The gate lines GL1 to GLn may receive gate signals sequentially provided from the gate driver 200.

The data lines DL1 to DLm may extend in a column direction and may be connected to the data driver 300. The data lines DL1 to DLm may receive data voltages from the data driver 300 in analog form.

Each of the pixels PX11 to PXnm may be connected to a corresponding gate line of the gate lines GL1 to GLn and a corresponding data line of the data lines DL1 to DLm. The pixels PX11 to PXnm may receive the data voltages through the corresponding data lines DL1 to DLm in response to the gate signals provided through the corresponding gate lines GL1 to GLn. The pixels PX11 to PXnm may display gray scales corresponding to the data voltages.

The gate driver 200 may be disposed in the non-display area NDA disposed adjacent to one side of the display area DA. The gate driver 200 may be disposed in the non-display area NDA adjacent to a left side of the display area DA in an amorphous silicon TFT gate driver circuit (ASG) form.

The gate driver 200 may generate the gate signals in response to a gate control signal applied from a timing controller mounted on the driving circuit board 400. The gate signals may be sequentially applied to the pixels PX11 to PXnm through the gate lines GL1 to GLn by rows. Thus, the pixels PX11 to PXnm may be driven by rows.

The data driver 300 may receive image signals and a data control signal from the timing controller. The data driver 300 may generate data voltages in analog form, the data voltages corresponding to the image signals, in response to the data control signal. The data driver 300 may apply the data voltages to the pixels PX11 to PXnm through the data lines DL1 to DLm.

The data driver 300 may include a plurality of source driving chips 310_1 to 310_k. Here, "k" is an integer number greater than 0 and smaller than "m". Each of the source driving chips 310_1 to 310_k may be mounted on a corresponding source flexible circuit board of source flexible circuit boards 320_1 to 320_k and connected between the driving circuit board 400 and the non-display area NDA disposed adjacent to an upper portion of the display area DA.

In the present exemplary embodiment, the source driving chips 310_1 to 310_k illustrated as being mounted on the flexible circuit boards 320_1 to 320_k in a tape carrier package (TCP) manner. In other implementations, the source driving chips 310_1 to 310_k may be mounted on the non-display area NDA disposed adjacent to the upper portion of the display area DA in the chip on glass (COG) manner.

Figure 2:
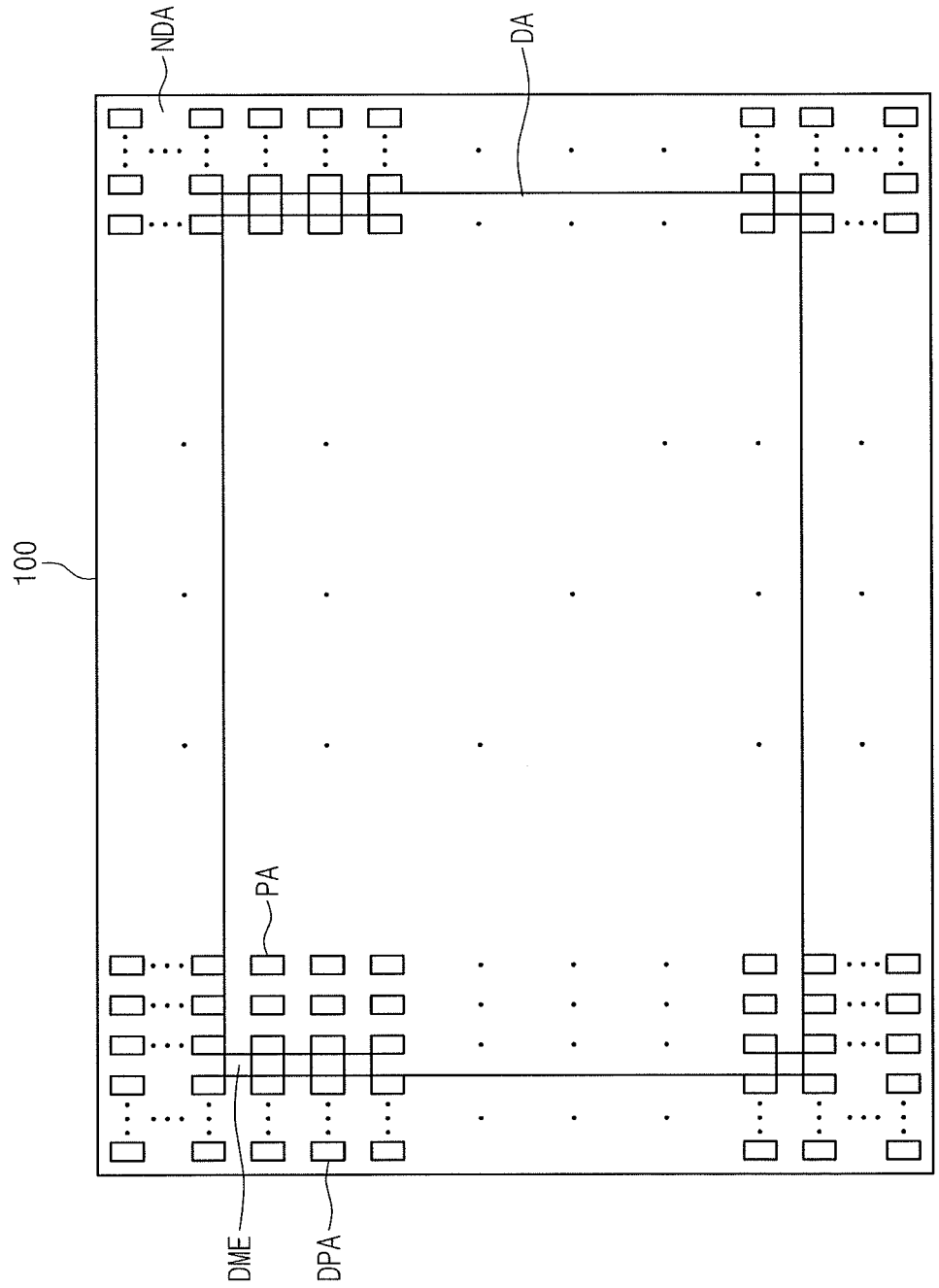
FIG. 2 illustrates a plan view showing a display panel shown in FIG. 1.

FIG. 2 illustrates a plan view showing the display panel shown in FIG. 1.

Referring to FIG. 2, the display panel 100 may include a plurality of pixel areas PA, a plurality of dummy pixel areas DPA, and a plurality of dummy electrodes DME.

The pixel areas PA respectively correspond to the pixel electrodes PX11 to PXnm and are arranged in the display area DA. The dummy pixel areas DPA respectively correspond to dummy pixels and are arranged in the non-display area NDA. The dummy electrodes DME may be disposed adjacent to both boundaries of the display area DA in the row direction. The dummy electrodes DME will be described in detail with reference to FIGS. 3 to 5.

Dummy pixel areas DPA disposed in the non-display area NDA adjacent to the left side of the display area DA may be disposed between the gate driver 200 and the display area DA. The dummy pixel areas DPA disposed in the non-display area NDA adjacent to the upper portion of the display area DA may be disposed between the data driver 300 and the display area DA.

As an example, the number of the dummy pixel areas DPA may be the same in the non-display area NDA adjacent to the upper portion, the lower portion, the left side, and the right side of the display area DA. In other implementations, the number of the dummy pixel areas DPA may be different in the non-display area NDA adjacent to the upper portion, the lower portion, the left side, or the right side of the display area DA.

Figure 3:
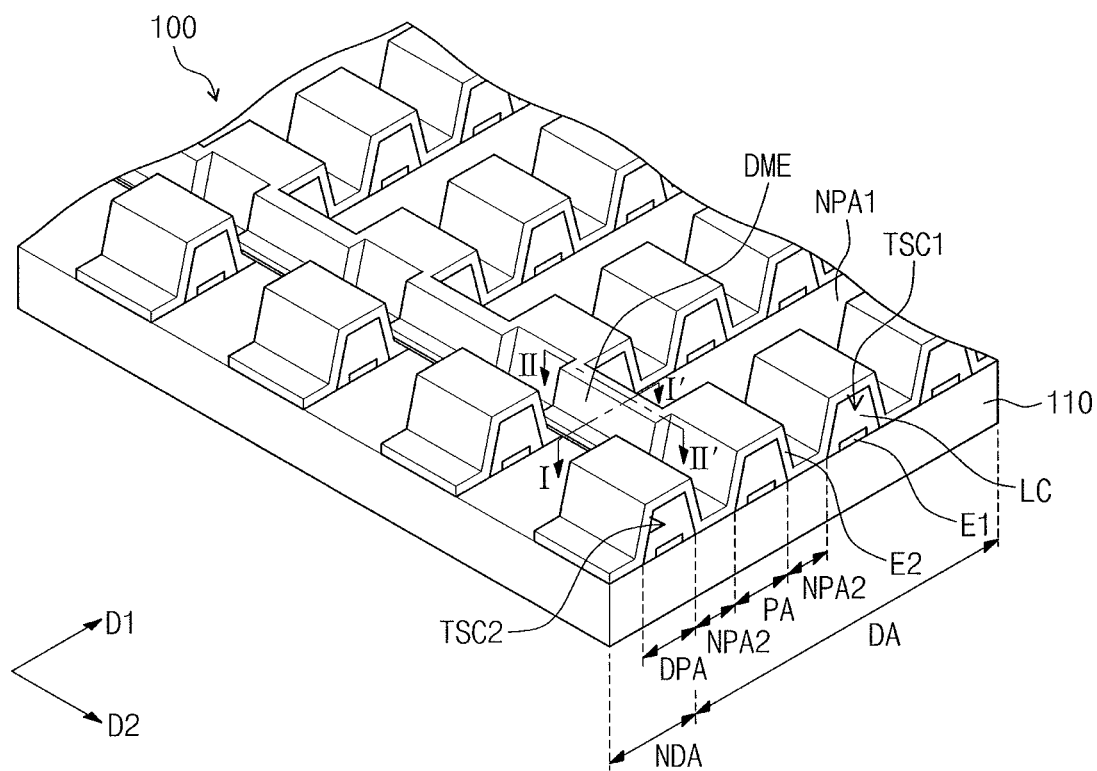
FIG. 3 illustrates a perspective view showing a portion of the display panel shown in FIG. 2.

FIG. 3 illustrates a perspective view showing a portion of the display panel shown in FIG. 2.

Referring to FIG. 3, the display panel 100 may include a substrate 110, a plurality of first electrodes E1, a plurality of second electrodes E2, and a plurality of dummy electrodes DME, which are disposed on the substrate 110.

The substrate 110 may include the display area DA and the non-display area NDA disposed adjacent to the display area DA when viewed in a plan view. The display area DA may include the pixel areas PA corresponding to the pixels PX11 to PXnm and non-pixel areas NPA1 and NPA2 disposed adjacent to the pixel areas PA.

Hereinafter, for convenience of description, the row direction will be referred to as a first direction D1 and the column direction crossing the row direction will be referred to as a second direction D2.

The non-pixel areas NPA1 and NPA2 may include a first non-pixel area NPA1 and a second non-pixel area NPA2. The first non-pixel area NPA1 may be disposed between the pixel areas PA in the second direction D2 and may extend in the first direction D1. The second non-pixel area NPA2 may be disposed between the pixel areas PA in the first direction D1 and may extend in the second direction D2.

As described above, the non-display area NDA may include the dummy pixel areas DPA corresponding to the dummy pixels. The pixel areas PA and the dummy pixel areas DPA may be arranged in a matrix form.

The first electrodes E1 may be arranged in the pixel areas PA of the substrate 110 to correspond to the pixels PX11 to PXnm, respectively. The first electrodes E1 may receive the data voltages through switching devices (hereinafter, referred to as thin film transistors) formed on the substrate 110, as described in detail with reference to FIGS. 6 to 9.

The first electrodes E1 may be arranged in the dummy pixel areas DPA to correspond to the dummy pixels, respectively. The first electrodes E1 disposed in the dummy pixel areas DPA are not connected to the thin film transistors. Accordingly, the first electrodes E1 disposed in the dummy pixel areas DPA do not receive the data voltages.

In the present exemplary embodiment, the first electrodes E1 may be disposed in the dummy pixel areas DPA. In other implementations, the first electrodes E1 may be omitted from the dummy pixel areas DPA.

The second electrodes E2 may be disposed on the substrate 110. The second electrodes E2 may be spaced apart from each other at regular intervals in the second direction D2 and may extend in the first direction D1. The second electrodes E2 may be common electrodes. The second electrodes E2 may be commonly connected to a common voltage line (not shown) disposed in the non-display area NDA. The second electrodes E2 may receive a common voltage through the common voltage line.

The second electrodes E2 may be disposed to overlap with the pixel areas PA arranged in the first direction D1. The second electrodes E2 may be disposed adjacent to the substrate 110 in the second non-pixel area NPA2 and may be upwardly spaced apart from the substrate 110 in the pixel areas PA to define first tunnel-shaped cavities TSC1. The first tunnel-shaped cavities TSC1 may be formed between the second electrodes E2 and the substrate 110 in the pixel areas PA.

An image display layer LC may be disposed in each of the first tunnel-shaped cavities TSC1. The image display layer LC may be driven by an electric field formed between the first electrodes E1 applied with the data voltages and the second electrodes E2 applied with the common voltage.

The image display layer LC may be a liquid crystal layer LC. In other implementations, the image display layer LC may be an electrophoretic layer or an electrowetting layer. Hereinafter, for convenience of description, the liquid crystal layer LC will be described as the image display layer LC.

The first tunnel-shaped cavity TSC1 may extends in the second direction D2, and both ends of the first tunnel-shaped cavity TSC1 may be open.

The second electrodes E2 may extend into the non-display area NDA to overlap with the dummy pixel areas DPA of the non-display area NDA in the first direction D1. The second electrodes E2 may be disposed adjacent to the substrate 110 in the non-display area NDA where the dummy pixel areas DPA are not defined and may be upwardly spaced apart from the substrate 110 in the dummy pixel areas DPA to define second tunnel-shaped cavities TSC2. The second tunnel-shaped cavities TSC2 may be formed between the second electrodes E2 and the substrate 110 in the dummy pixel areas DPA.

The image display layer LC is not disposed in the second tunnel-shaped cavities TSC2. In addition, the data voltage is not applied to the first electrode E1 disposed in each of the second tunnel-shaped cavities TSC2. Therefore, the image is not displayed in the second tunnel-shaped cavities TSC2.

The second tunnel-shape cavity TSC2 may extend in the second direction D2, and both ends of the second tunnel-shaped cavity TSC2 may be open.

The dummy electrodes DME may be disposed in cross areas of the first non-pixel area NPA1 and the second non-pixel area NPA2, at locations that are respectively adjacent to both boundaries of the display area DA in the first direction D1. The cross areas of the first non-pixel area NPA1 and the second non-pixel area NPA2, which are respectively adjacent to both boundaries of the display area DA in the first direction D1, are referred to herein as first cross areas.

The dummy electrodes DME may be upwardly spaced apart from the substrate 110 by a predetermined distance in the first cross areas to define dummy tunnel-shaped cavities. Both ends of each dummy tunnel-shaped cavity may be open.

The dummy electrodes DME may be disposed between the second electrodes E2 in the second non-pixel area NPA2 adjacent to the non-display area NDA and may be connected to the second electrodes E2. The dummy tunnel-shaped cavities will be described in detail with reference to FIGS. 4 and 5.

A roof layer may be disposed on the substrate 110 and may extend in the first direction D1 to cover an upper surface of the second electrodes E2. In addition, the roof layer may be disposed to cover an upper surface of the dummy electrodes DME. A sealing layer may be disposed on the roof layer. The sealing layer may cover the substrate 110 to seal both ends of the first and second tunnel-shaped cavities TSC1 and TSC2 and both ends of the dummy tunnel-shaped cavity. The roof layer and the sealing layer will be described in detail below.

Figure 4:
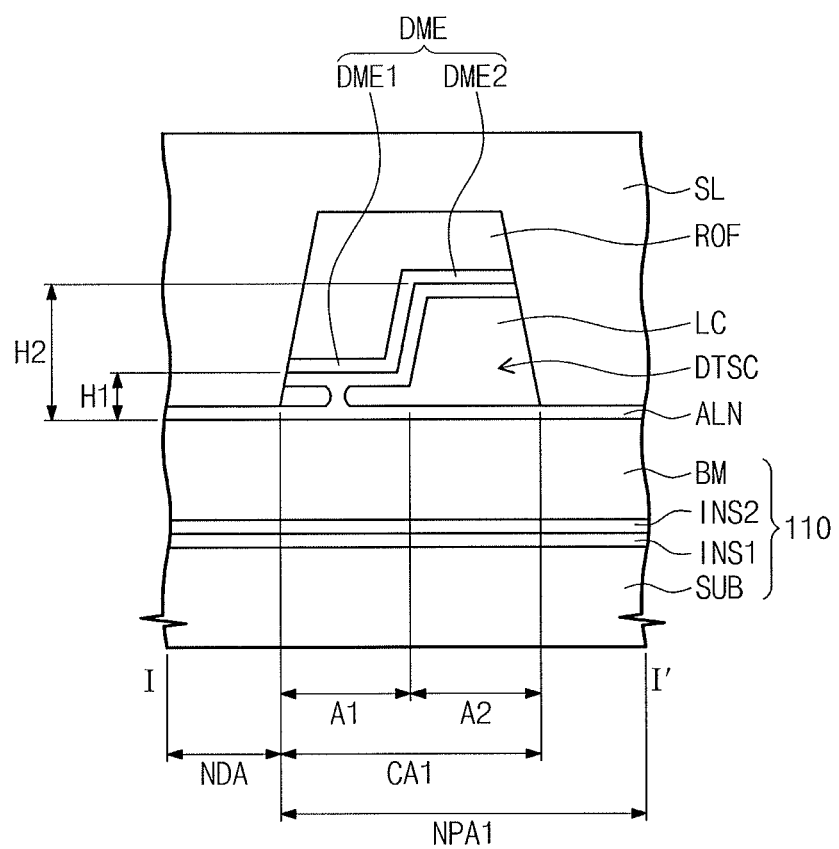
FIG. 4 illustrates a cross-sectional view taken along a line I-I' shown in FIG. 3.
Figure 5:
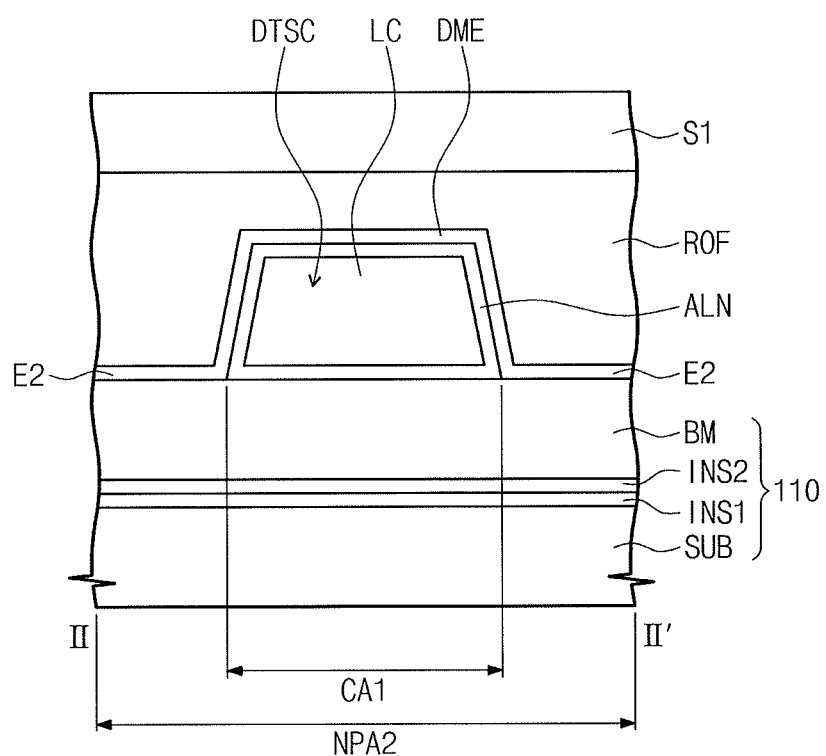
FIG. 5 illustrates a cross-sectional view taken along a line II-IP shown in FIG. 3.

FIG. 4 illustrates a cross-sectional view taken along a line I-I' shown in FIG. 3 and FIG. 5 illustrates a cross-sectional view taken along a line II-II' shown in FIG. 3.

Referring to FIGS. 4 and 5, the substrate 110 may include a base substrate SUB, and a first insulating layer INS1, a second insulating layer INS2, and a black matrix BM, which are disposed on the base substrate SUB.

The first insulating layer INS1 may be disposed on the base substrate SUB and the second insulating layer INS2 may be disposed on the first insulating layer INS1. The black matrix BM may be disposed on the second insulating layer INS2. The black matrix BM may be disposed in the first and second non-pixel areas NPA1 and NPA2 and the non-display area NDA to block light.

The dummy electrode DME may be upwardly spaced apart from the substrate 110 in the first cross area CA1 by a predetermined distance to form the dummy tunnel-shaped cavity DTSC. The dummy electrode DME may be disposed on the black matrix BM of the substrate 110 and upwardly spaced apart from the black matrix BM in the first cross area CA1 by the predetermined distance to form the dummy tunnel-shaped cavity DTSC. As shown in FIG. 4, both ends of the dummy tunnel-shaped cavity DTSC in the first direction D1 may be opened.

The first electrode E1 is not disposed in the dummy tunnel-shaped cavity DTSC. Accordingly, the data voltage is not applied in the dummy tunnel-shaped cavity DTSC. Thus, the liquid crystal layer LC disposed in the dummy tunnel-shaped cavity DTSC is not driven.

As shown in FIG. 5, the dummy electrode DME may be disposed between and connected to the second electrodes E2 in the second non-pixel area NPA2 adjacent to the non-display area NDA.

The dummy electrode DME may include a first dummy electrode DME1 upwardly spaced apart from the substrate 110 by a first height H1 and a second dummy electrode DME2 upwardly spaced apart from the substrate 110 by a second height H2. The second height H2 may be greater than the first height H1.

The first dummy electrode DME1 may be disposed adjacent to the non-display area NDA. The second dummy electrode DME2 is disposed at a right side of the first dummy electrode DME1 (for example, a side of the dummy electrode DME away from the non-display area NDA) and connected to the first dummy electrode DME1. One end of the first dummy electrode DME1 may be disposed adjacent to the non-display area NDA and the other end of the first dummy electrode DME1 may be connected to the second dummy electrode DME2.

The dummy tunnel-shaped cavity DTSC may include a first area A1 defined between the first dummy electrode DME1 and the substrate 110 and a second area A2 defined between the second dummy electrode DME2 and the substrate 110.

An alignment layer ALN may be disposed on an inner surface of the first and second dummy electrodes DME1 and DME2 and disposed on the substrate 110 in the dummy tunnel-shaped cavity DTSC. In addition, the alignment layer ALN may be disposed on the substrate 110 in the first non-pixel area NPA1 and the non-display area NDA in which the second electrode E2 is not disposed. As shown in FIG. 4, the alignment layer ALN may be formed to seal the dummy tunnel-shaped cavity DTSC in a predetermined area of the first area A1.

The liquid crystal layer LC may be disposed in the first area A1 sealed by the alignment layer ALN and in the dummy tunnel-shape cavity DTSC of the second area A2. The first electrode E1 is not disposed in the dummy tunnel-shaped cavity DTSC. Accordingly, the liquid crystal layer LC disposed in the dummy tunnel-shaped cavity DISC is not driven.

The roof layer ROF may be disposed on the second electrode E2 and the dummy electrode DME to cover the upper surface of the dummy electrode DME. The roof layer ROF may planarize the upper surfaces of the second electrode E2 and the dummy electrode DME. For example, an upper surface of the roof layer ROF may be planarized.

The sealing layer SL may be disposed on the roof layer ROF. The sealing layer SL may cover the substrate 110 to block the both open ends of the dummy tunnel-shaped cavity DTSC, thereby sealing the dummy tunnel-shaped cavity DTSC.

Figure 6:
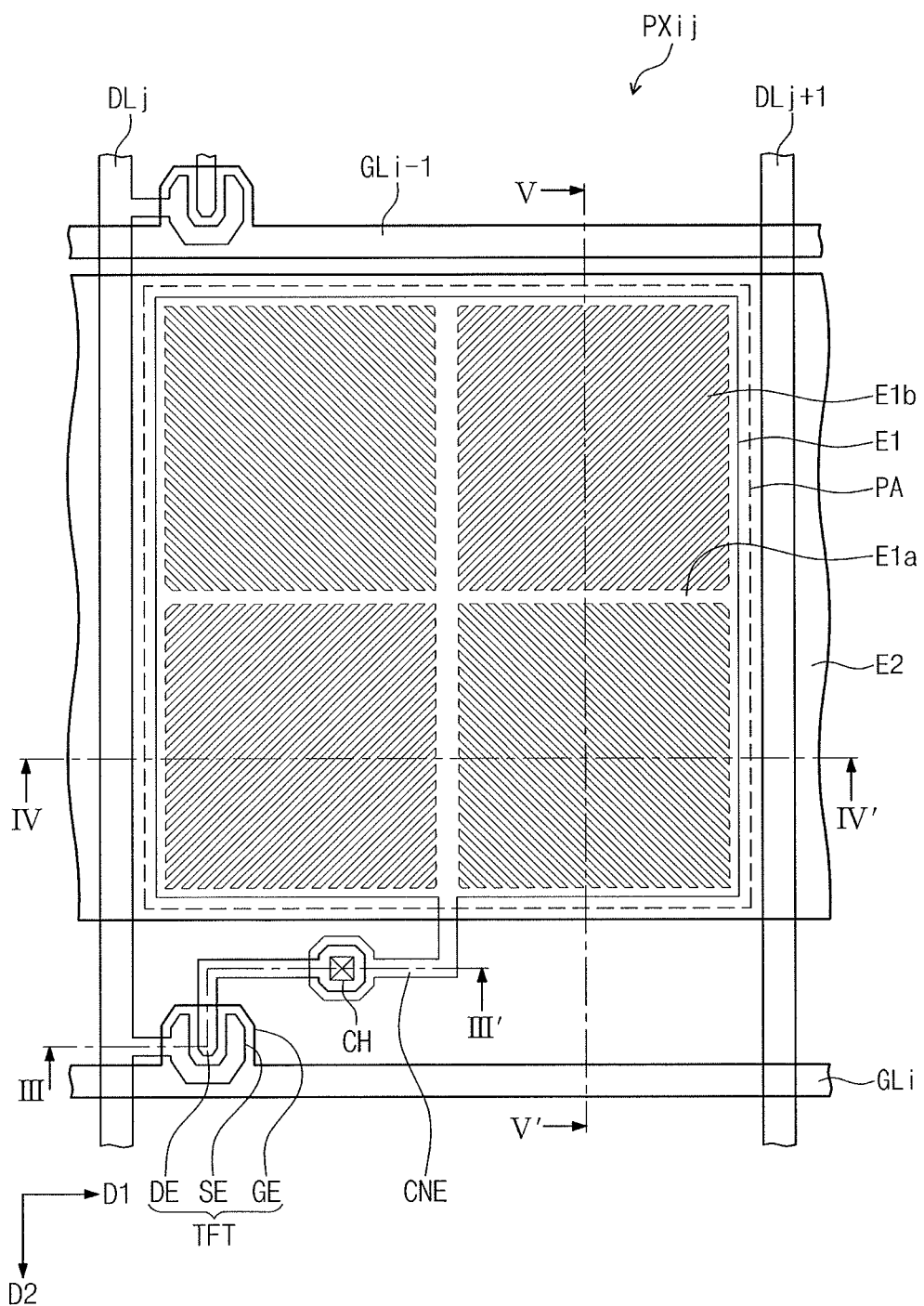
FIG. 6 illustrates a layout diagram showing a pixel shown in FIG. 1.

FIG. 6 illustrates a layout diagram showing the pixel illustrated in FIG. 1.

FIG. 6 shows only one pixel PXij, but other pixels have the same structure as that of the pixel PXij. Accordingly, hereinafter, the structure of the pixel PXij will be described in detail, and it is to be understood that such description may apply to the other pixels as well.

The dummy pixel has the same structure as the pixel PXij except that the dummy pixel does not include the thin film transistor and the liquid crystal layer. In addition, as described above, the dummy pixel may not include the first pixel electrode E1. Therefore, the structure of the dummy pixel may be predictable from the structure of the pixel PXij, and thus a detailed description of such same structure the dummy pixel will not be repeated.

Referring to FIG. 6, the gate lines GLi−1 and GLi may extend in the first direction D1 and the data lines DLj and DLj+1 may extend in the second direction D2 to cross the gate lines GLi−1 and GLi. Herein, "i" is an integer number larger than zero (0) and equal to or smaller than "n". "j" is an integer number equal to or smaller than "m".

The pixel PXij may include a thin film transistor TFT connected to the corresponding gate line GLi and the corresponding data line DLj, the first electrode E1 connected to the thin film transistor TFT, the second electrode E2 defining the first tunnel-shaped cavity TSC1, and the liquid crystal layer LC disposed in the first tunnel-shaped cavity TSC1. The second electrode E2 defining the first tunnel-shaped cavity TSC1 and the liquid crystal layer LC disposed in the first tunnel-shaped cavity TSC1 will be described with reference to FIGS. 7 to 9.

The pixel PXij may include the pixel area PA and the non-pixel areas NPA1 and NPA2 disposed adjacent to the pixel area PA. The image may be displayed in the pixel area PA and not displayed in the non-pixel areas NPA1 and NPA2. Light traveling to the non-pixel areas NPA1 and NPA2 may be blocked.

The gate lines GLi−1 and GLi and the thin film transistor TFT may be disposed in the first non-pixel area NPA1 of the non-pixel areas NPA1 and NPA2. The data lines DLj and DLj+1 may be disposed in the second non-pixel area NPA2 of the non-pixel areas NPA1 and NPA2.

The thin film transistor TFT may include a gate electrode GE connected to the gate line GLi, a source electrode SE connected to the data line DLj, and a drain electrode DE connected to the first electrode E1.

The gate electrode GE of the thin film transistor TFT may be branched from the gate line GLi. The source electrode SE may be branched from the data line DLj. The drain electrode DE may be electrically connected to a connection electrode CNE branched from the first electrode E1 through a contact hole CH. The connection electrode CNE may be disposed in the first non-pixel area NPA1.

The first electrode E1 may be disposed in the corresponding pixel area PA. The first electrode E1 may be disposed in the pixel area PA to overlap with the second electrode E2.

The first electrode E1 may include a trunk portion E1a and a plurality of branch portions E1b extending from the trunk portion E1a in a radial form. The trunk portion E1a may have various shapes. In the present exemplary embodiment, the trunk portion E1a may have a cross shape as shown in FIG. 6. In this case, the pixel PXij may be divided into four domains by the trunk portion E1a.

The branch portions E1b may extend in different directions according to each domain. The branch portions E1b may extend substantially in parallel to each other and may be spaced apart from each other in each domain divided by the trunk portion E1a. A distance between two adjacent branch portions E1b to each other may be measured in terms of micrometers For example, a plurality of micro-slits may be formed.

Liquid crystal molecules of the liquid crystal layer LC of the pixel PXij may be pre-tilted in different directions in each domain due to the micro-slits. Accordingly, four domains in which the liquid crystal molecules are aligned in different directions may be formed in the liquid crystal layer LC. As described above, when the liquid crystal molecules are aligned in various directions, a reference viewing angle of the display apparatus 500 including the liquid crystal layer LC may be enhanced.

The second electrode E2 may extend in the first direction D1 to overlap with the pixel area PA. The second electrode E2 may receive a common voltage.

The first and second electrodes E1 and E2 may include a transparent conductive material, e.g., indium tin oxide (ITO), indium zinc oxide (IZO), indium tin zinc oxide (ITZO), etc.

Figure 7:
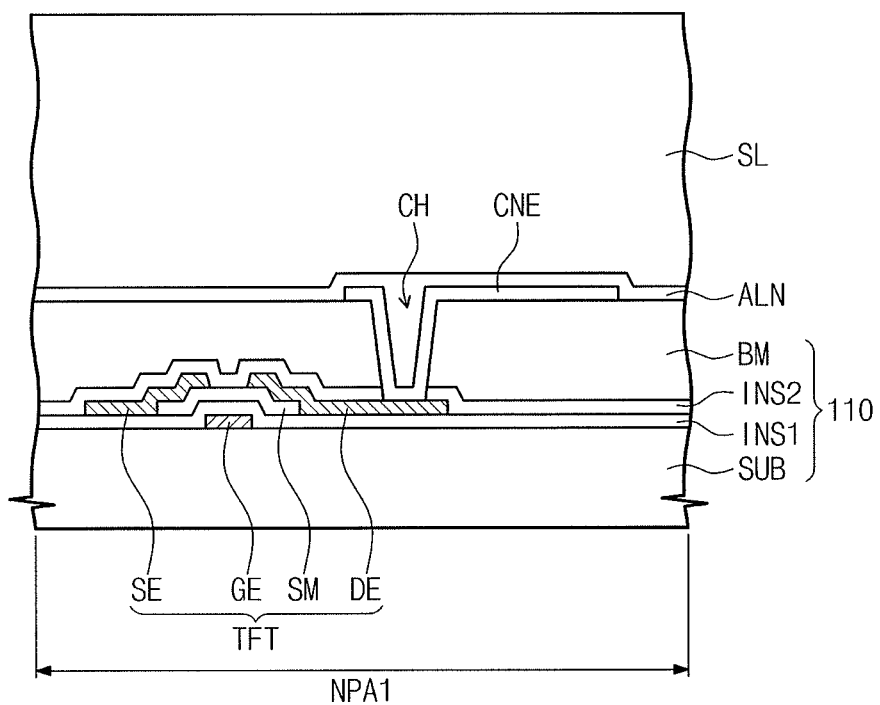
FIG. 7 illustrates a cross-sectional view taken along a line shown in FIG. 6.
Figure 8:
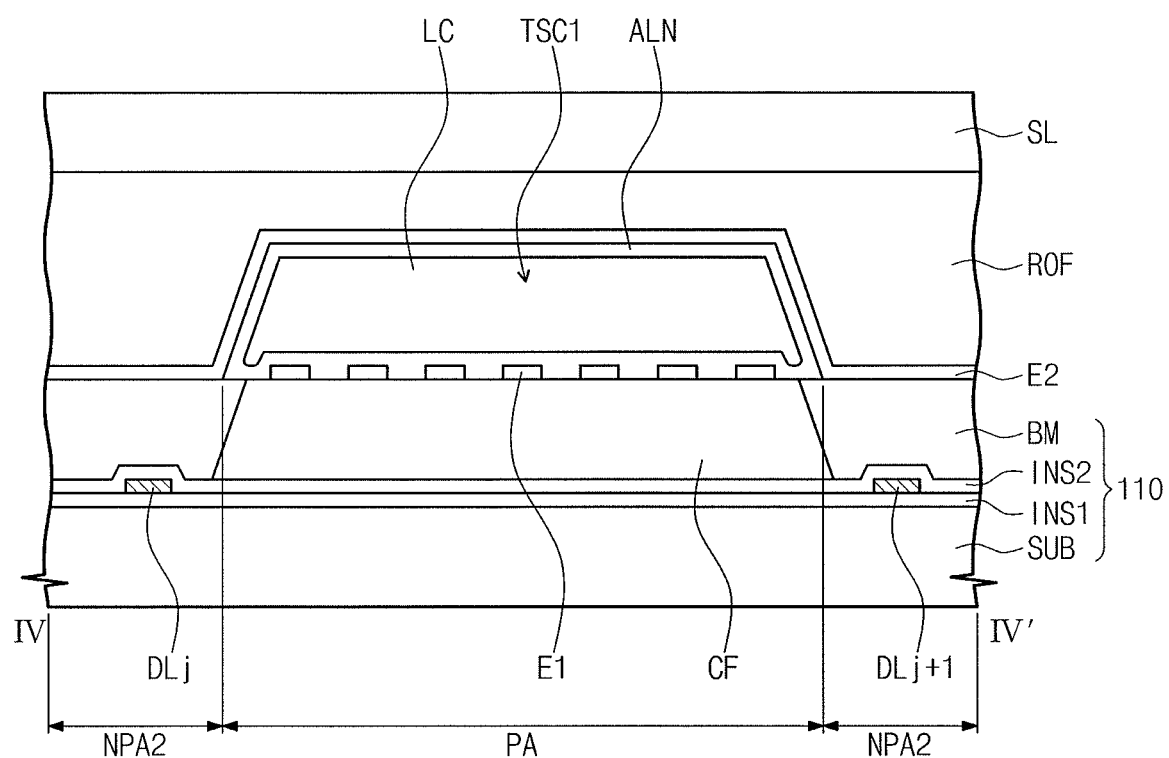
FIG. 8 illustrates a cross-sectional view taken along a line IV-IV' shown in FIG. 6.
Figure 9:
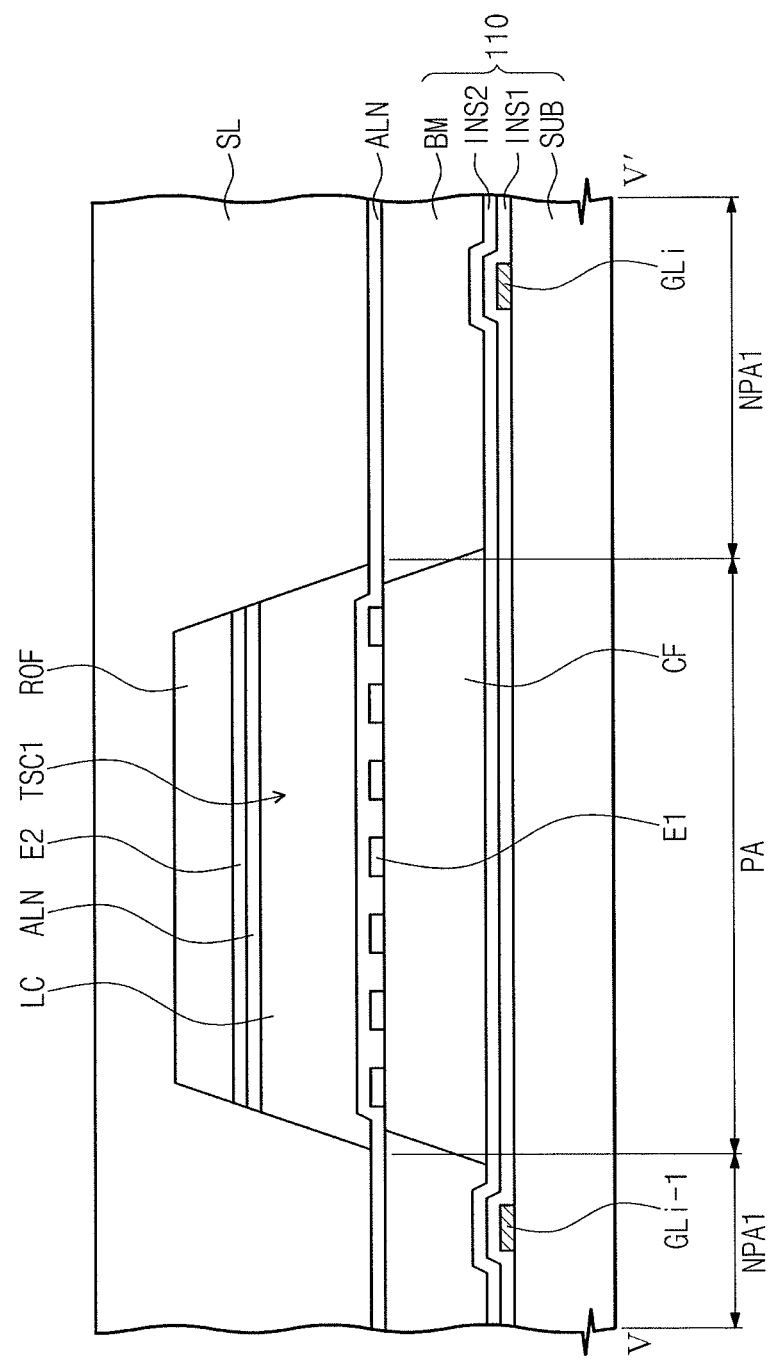
FIG. 9 illustrates a cross-sectional view taken along a line V-V' shown in FIG. 6.

FIG. 7 illustrates a cross-sectional view taken along a line shown in FIG. 6, FIG. 8 illustrates a cross-sectional view taken along a line IV-IV' shown in FIG. 6, and FIG. 9 illustrates a cross-sectional view taken along a line V-V' shown in FIG. 6.

Referring to FIGS. 7, 8, and 9, the substrate 110 may include the base substrate SUB. The thin film transistor TFT, the color filter CF, the black matrix BM, and first and second insulating layers INS1 and INK may be disposed on the base substrate SUB. The first electrode E1, the second electrode E2, the liquid crystal layer LC, the roof layer ROF, and the sealing layer SL may be disposed on the substrate 110.

The gate lines GLi−1 and GLi may be disposed on the base substrate SUB. The first insulating layer INS1 may be disposed on the base substrate SUB to cover the gate lines GLi−1 and GLi. The base substrate SUB may be a transparent or non-transparent insulating substrate. For instance, the base substrate SUB may be a silicon substrate, a glass substrate, or a plastic substrate.

The first insulating layer INS1 may be a gate insulating layer. The first insulating layer INS1 may be an inorganic insulating layer formed of an inorganic material. For instance, the first insulating layer INS1 may include an insulating material, e.g., silicon nitride, silicon oxide, etc. The data lines DLj and DLj+1 may extend to cross the gate lines GLi−1 and GLi and may be disposed on the first insulating layer INS1.

As shown in FIG. 7, the thin film transistor TFT may be disposed on the base substrate SUB. The thin film transistor TFT may include the gate electrode GE, a semiconductor layer SM, the source electrode SE, and the drain electrode DE.

The gate electrode GE may be branched from the gate line GLi and disposed on the base substrate SUB. The first insulating layer INS1 may be disposed on the base substrate SUB to cover the gate electrode GE. The semiconductor layer SM of the thin film transistor TFT may be disposed on the first insulating layer INS1 that covers the gate electrode GE. Although not shown in figures, the semiconductor layer SM may include an active layer and an ohmic contact layer.

The source electrode SE and the drain electrode DE of the thin film transistor TFT may be disposed on the semiconductor layer SM and the first insulating layer INS1 and may be spaced apart from each other. The semiconductor layer SM may form a conductive channel between the source electrode SE and the drain electrode DE.

The second insulating layer INS2 may be disposed on the first insulating layer INS1 to cover the thin film transistor TFT. In addition, the second insulating layer INS2 may be disposed on the first insulating layer INS1 to cover the data lines DLj and DLj+1. The second insulating layer INS2 may serve as a passivation layer. The second insulating layer INS2 may cover the exposed upper surface of the semiconductor layer SM.

As shown in FIGS. 8 and 9, the color filter CF may be disposed on the second insulating layer INS2 in the pixel area PA. The black matrix BM may be disposed on the second insulating layer INS2 in the non-pixel areas NPA1 and NPA2. The color filter CF and the black matrix BM may overlap each other in the boundary between the pixel area PA and the non-pixel areas NPA1 and NPA2.

The color filter CF may assign a color to light that is transmitted through the pixel. The color filter CF may be a red color filter, a green color filter, or a blue color filter and may be disposed to correspond to the pixel area PA. Color filters CF having different colors may be disposed in the pixel areas PA such that the pixels adjacent to each other may display different colors among the pixels PX11 to PXnm shown in FIG. 1.

The black matrix BM may undesirable light in the non-pixel areas NPA1 and NPA2. The black matrix BM may prevent light leakage caused by malfunction of the liquid crystal molecules in edges of the pixel area PA adjacent to the non-pixel areas NPA1 and NPA2. In addition, the black matrix BM may prevent colors from mixing in edges of the color filter CF adjacent to the non-pixel areas NPA1 and NPA2.

The contact hole CH may be formed through the second insulating layer INS2 and the black matrix BM to expose a portion of the drain electrode DE. The drain electrode DE of the thin film transistor TFT may be connected to the first electrode E1 through the contact hole CH.

The second electrode E2 may be disposed on the black matrix BM and the color filter CF and may extend in the first direction D1. The second electrode E2 may be disposed to overlap with the pixel areas PA and the second non-pixel area NPA2, which are arranged in the first direction D1. In addition, the second electrode E2 may be disposed to overlap with the first electrode E1 in the pixel area PA.

The second electrode E2 may be disposed adjacent to the black matrix BM in the second non-pixel area NPA2 and may be upwardly spaced apart from the color filter CF in the pixel area PA to form the first tunnel-shaped cavity TSC1. The liquid crystal layer LC may be disposed in the first tunnel-shaped cavity TSC1.

The alignment layer ALN may be disposed on the black matrix BM in the first non-pixel area NPA1. The alignment layer ALN may be disposed on the black matrix BM to cover the connection electrode CNE in the non-pixel area NPA1.

The alignment layer ALN may be disposed on the color filter CF in the pixel area PA to cover the first electrode E1 and may be disposed on the inner surface of the second electrode E2 in the first tunnel-shaped cavity TSC1.

The roof layer ROF may be disposed on the second electrode E2 and may extend in the first direction D1. The roof layer ROF may extend in the first direction D1, in which the second electrode E2 extends, and may cover the upper surface of the second electrode E2. The roof layer ROF may planarize the upper portion of the second electrode E2. For example, the upper surface of the roof layer ROF may be planarized. The roof layer ROF may be an organic layer including an organic material.

The first tunnel-shaped cavity TSC1 may extend in the second direction D2. Both ends of the first tunnel-shaped cavity TSC1 in the second direction D2 may be open. The roof layer ROF is not disposed at the ends in upper and lower directions of the first tunnel-shaped cavity TSC1. Accordingly, both ends of the first tunnel-shaped cavity TSC1 may be opened. Both ends of the first tunnel-shaped cavity TSC1 may be disposed adjacent to the first non-pixel area NPA1.

Although not shown in figures, an inorganic insulating layer may be further disposed between the second electrode E2 and the roof layer ROF. The inorganic insulating layer may include the inorganic material, e.g., silicon nitride or silicon oxide. The inorganic insulating layer may support the roof layer ROF such that the first tunnel-shaped cavity TSC1 is stably maintained by the roof layer ROF.

The sealing layer SL may be disposed on the roof layer ROF. The sealing layer SL may cover the base substrate SUB and may block both open ends of the first tunnel-shaped cavity TSC1 to seal the first tunnel-shaped cavity TSC1. The sealing layer SL may be an organic layer formed of an organic material, as an example. In other implementations, the sealing layer SL may be formed by stacking the organic layer formed of the organic material and the inorganic layer formed of the inorganic material.

The thin film transistor TFT may be turned on in response to the gate signal provided through the gate line GLi. The data voltage provided through the data line DLj may be applied to the first electrode E1 through the turned-on thin film transistor TFT. The second electrode E2 may be applied with the common voltage.

Due to a difference in level between the data voltage and the common voltage, the electric field may be formed between the first electrode E1 and the second electrode E2. The liquid crystal molecules of the liquid crystal layer LC may be driven by the electric field formed between the first electrode E1 and the second electrode E2. As a result, a variation in amount of the light passing through the liquid crystal layer LC may occur, and thus a desired image may be displayed.

The display apparatus 500 according to the present exemplary embodiment may include one substrate 110. Accordingly, a manufacturing cost of the display apparatus 500 may be reduced.

When the display apparatus 500 is manufactured, an alignment liquid may be provided on the substrate 110 to form the alignment layer ALN after the roof layer ROF is formed. The alignment liquid may fill in the first tunnel-shaped cavities TSC1, the second tunnel-shaped cavities TSC2, and the dummy tunnel-shaped cavities DTSC. When the alignment liquid is dried, the alignment layer ALN may be formed in the first tunnel-shaped cavities TSC1, the second tunnel-shaped cavities TSC2, and the dummy tunnel-shaped cavities DTSC.

If the second tunnel-shaped cavities TSC2 and the dummy tunnel-shaped cavities DTSC were not defined in the display panel 100, the alignment layer would only be provided to the first tunnel-shaped cavities TSC1 and would not be provided to the non-display area NDA.

In this case, solvent particles evaporated from the alignment liquid provided to the pixel areas PA adjacent to the boundary of the display area DA could enter into atmosphere over the display panel 100 and the non-display area NDA. The solvent particles of the alignment liquid provided to the pixel areas PA could move to the atmosphere over the display panel 100 as the alignment liquid becomes closer to the center portion of the display area DA.

Accordingly, a density of the solvent particles in the atmosphere over the pixel areas PA adjacent to the boundary of the display area DA could be lower than a density of the solvent particles in the atmosphere over the pixel areas PA disposed in the center portion of the display area DA. That is, the density of the solvent particles in the atmosphere over the pixel areas PA could be increased as the solvent particles come closer to the center portion of the display area DA.

In general, evaporated particles may be in a saturated state under the atmosphere. That is, the density of the solvent particles could gradually increase and could reach a saturated state in which the density of the solvent particles is not increased. Therefore, the density of the solvent particles in the atmosphere over the pixel areas PA could become saturated as it becomes closer to the center portion of the display area DA.

As the density of the solvent particles in the atmosphere becomes lower, a drying speed of the alignment liquid becomes faster. Due to the difference in drying speed, the thickness of the alignment layer ALN disposed in the first tunnel-shaped cavities TSC1 of the pixel areas PA could become non-uniform.

However, accordingly to embodiments, dummy pixels are disposed in the non-display area NDA. Thus, the alignment liquid may be provided to the second tunnel-shaped cavities TSC2 in the dummy pixel areas DPA. In this case, the density of the solvent particles in the atmosphere over the dummy pixel areas DPA may gradually increase, and then may become saturated in the atmosphere over the pixel areas PA of the display area DA. The area in which the dummy pixels are arranged may be set to allow the density of the solvent particles in the atmosphere over the display area DA to be saturated. Accordingly, the density of the solvent particles in the atmosphere over the pixel areas PA may be uniform.

When the density of the solvent particles in the atmosphere over the pixel areas PA becomes uniform, the alignment liquid provided to the first tunnel-shaped cavities TSC1 of the pixel areas PA may be dried at a constant drying speed. As a result, the alignment layer ALN may be formed in the tunnel-shaped cavities TSC1 in a uniform thickness.

In addition, a liquid crystal in fluid state may be provided to the first non-pixel area NPA1 to form the liquid crystal layer LC after the alignment layer ALN is formed. The liquid crystal may flow into the first tunnel-shaped cavities TSC1 through the first non-pixel area NPA1 by a capillary phenomenon.

The liquid crystal may be provided to the pixel areas PA used to display the image and may not be provided to the dummy pixel areas DPA. The first area A1 of each of the dummy tunnel-shaped cavities DTSC disposed in the first cross area CA1 may be closed by the alignment layer ALN. Therefore, the liquid crystal may be blocked in the first area A1 of each of the dummy tunnel-shaped cavities DTSC and may not move to the non-display area NDA. The liquid crystal may not provided to the second tunnel-shaped cavities TSC2 of the dummy pixels.

The display apparatus 500 according to the present exemplary embodiment may include the uniform alignment layer and may prevent the liquid crystal from flowing into the non-display area NDA.

FIGS. 10 to 17 illustrates views showing stages of a manufacturing method of the display apparatus 500 according to the present exemplary embodiment. Hereinafter, the manufacturing method of the display apparatus 500 will be described in detail. A method of forming the second tunnel-shaped cavity of the dummy pixel is substantially the same as a method of forming the first tunnel-shaped cavity of the pixel. Accordingly, a description of the substantially same forming method of the second tunnel-shaped cavity of the dummy pixel will not be repeated.

For the convenience of explanation, the first electrodes E1 disposed in the pixel areas PA will be omitted in FIGS. 10 to 17, and the manufacturing method of the display apparatus 500 will be explained with reference to the first substrate 110 in FIGS. 10 to 17.

In addition, for the convenience of explanation, the manufacturing method of the display apparatus 500 will be described in detail with reference to cross-sectional views taken along the lines I-I' and II-II' shown in FIG. 3 and the lines IV-IV' and V-V' shown in FIG. 6.

Figure 10:
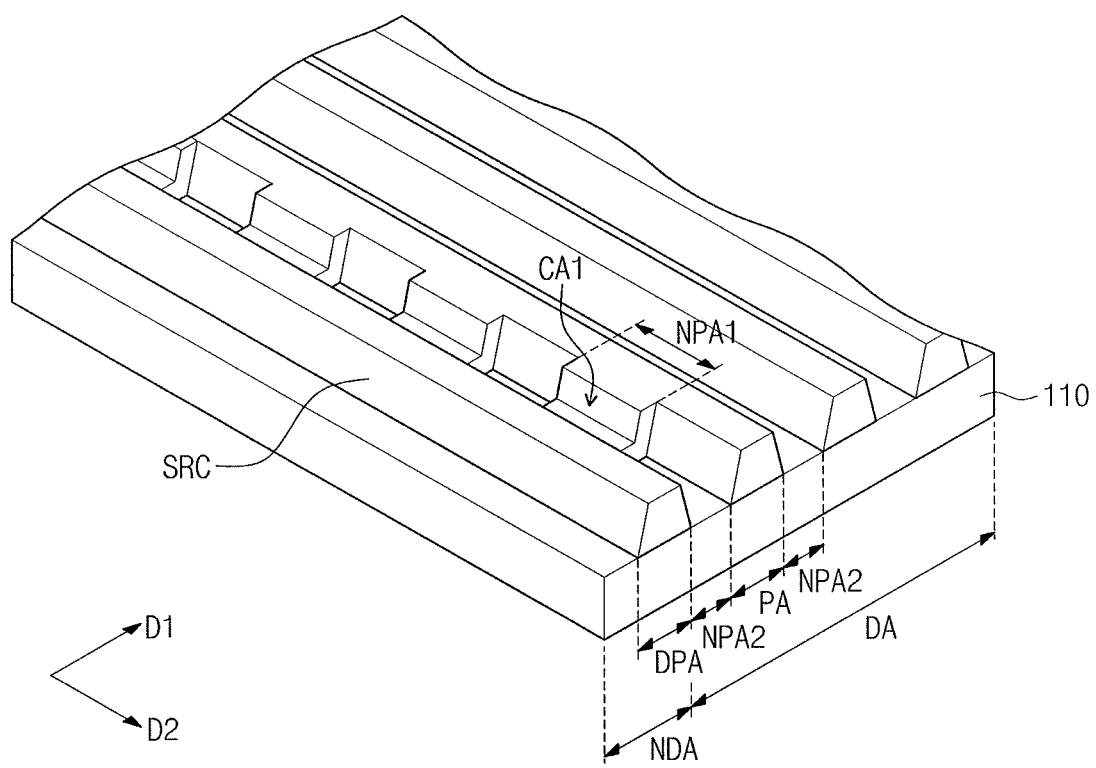
FIG. 10 illustrates a perspective view showing a sacrificial layer disposed on a substrate.

FIG. 10 illustrates a perspective view showing a sacrificial layer disposed on a substrate.

Referring to FIG. 10, the substrate 110 may be prepared and a sacrificial layer SRC, which extends in the second direction D2, may be formed on the substrate 110. In addition, the sacrificial layer SRC may be formed in the first cross areas CA1. Although not shown in FIG. 10, the first electrodes E1 may be formed on the substrate 110 in the pixel areas PA and the dummy pixel areas DPA.

The sacrificial layers SRC may be formed to overlap with the pixel areas PA in the second direction D2. In addition, the sacrificial layers SRC may be formed to overlap with the dummy pixel area DPA in the second direction D2.

Figure 11A:
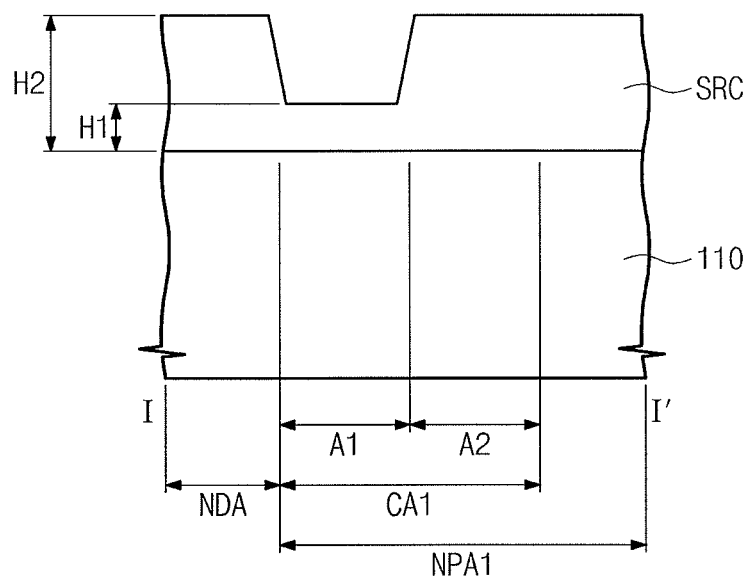
FIGS. 11A and 11B illustrate cross-sectional views showing a sacrificial layer disposed at a first crossing area.
Figure 11B:
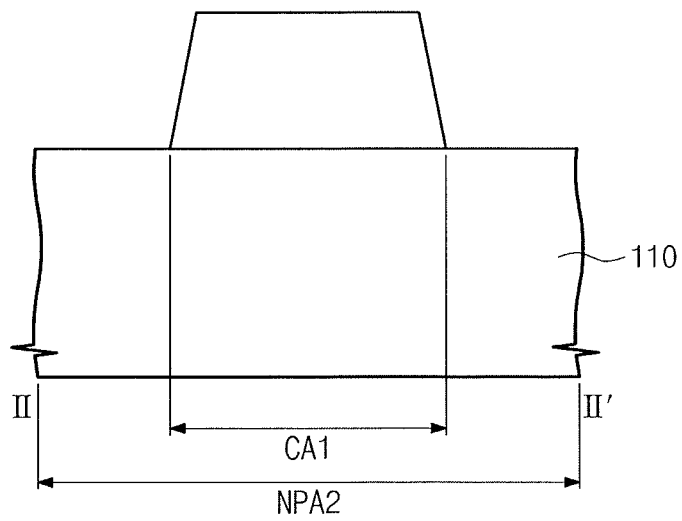

FIGS. 11A and 11B illustrate cross-sectional views showing the sacrificial layer disposed at the first crossing area.

Referring to FIGS. 11A and 11B, the sacrificial layer SRC formed in the first cross area CA1 may have the first and second heights H1 and H2 with respect to the substrate 110 in the first direction D1. The sacrificial layer SRC having the first height H1 may be formed in the first area A1 and the sacrificial layer SRC having the second height H2 may be formed in the second area A2.

Figure 11C:
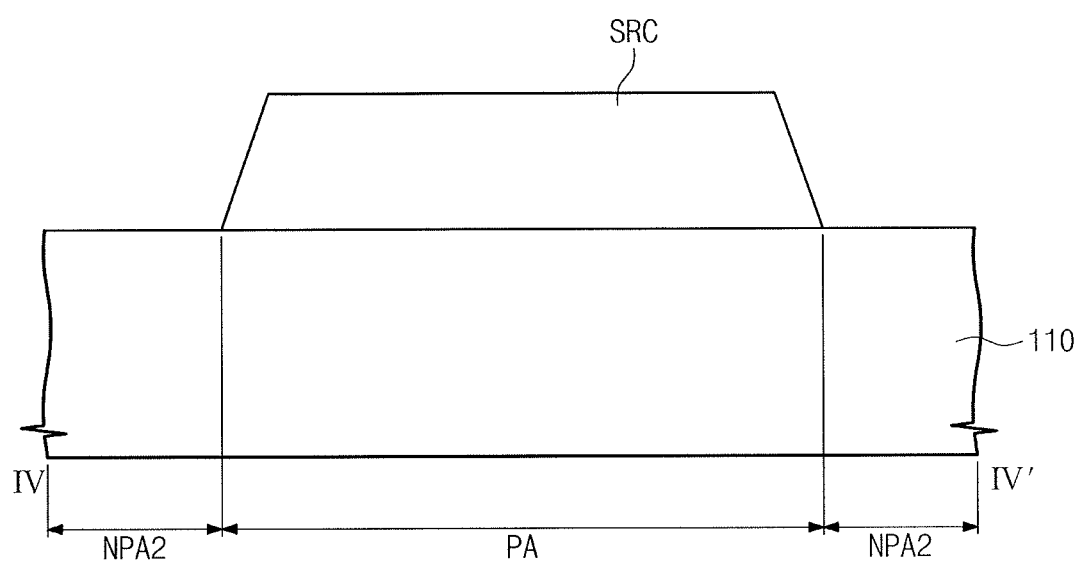
FIGS. 11C and 11D illustrate cross-sectional views showing a sacrificial layer overlapped with pixel areas.
Figure 11D:
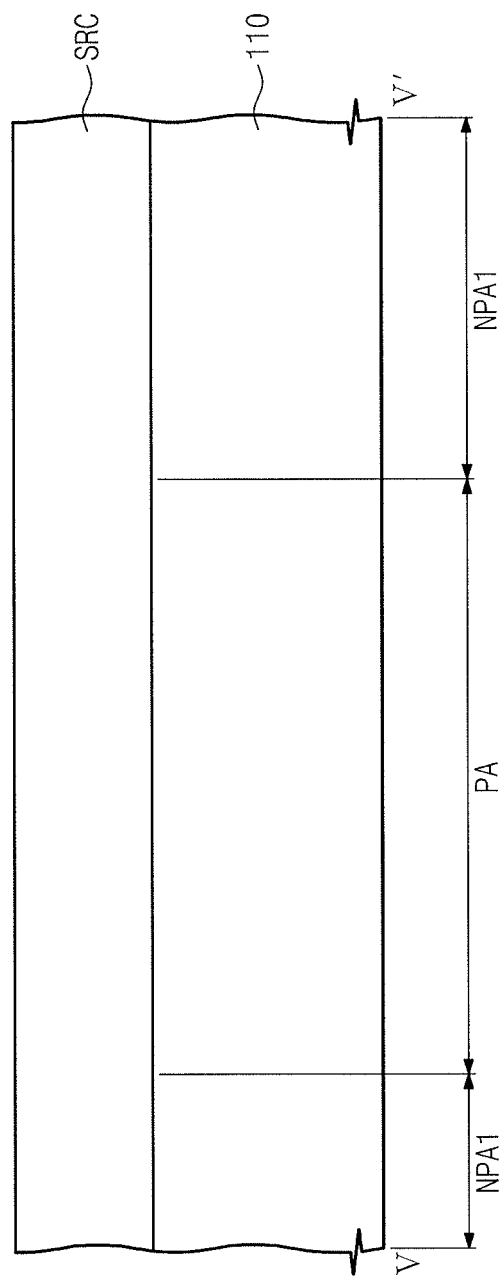

FIGS. 11C and 11D illustrate cross-sectional views showing the sacrificial layer overlapped with the pixel areas.

Referring to FIGS. 11C and 11D, the sacrificial layer SRC may extend in the second direction D2 in the display area DA to overlap with the pixel areas PA and the first non-pixel areas NPA.

The sacrificial layer SRC formed in the non-display area NDA may extend in the second direction D2 to overlap with the dummy pixel areas DPA.

FIGS. 12A, 12B, 12C, and 12D illustrate views showing the second electrode, the dummy electrode, and the roof layer, which are disposed on the substrate.

Referring to FIGS. 12A to 12D, the dummy electrode DME may be formed on the sacrificial layer SRC in the first cross area CA1. The dummy electrode DME may be formed to be upwardly spaced apart from the substrate 110 by the sacrificial layer SRC.

The second electrode E2 may be disposed on the substrate 110 and may extend in the first direction D1. The second electrode E2 may be formed to overlap with the pixel areas PA arranged in the first direction D1. The second electrode E2 may be disposed adjacent to the substrate 110 in the second non-pixel area NPA2 and disposed on the sacrificial layer SRC in the pixel area PA to be upwardly spaced apart from the substrate 110 by the predetermined distance.

Figure 12A:
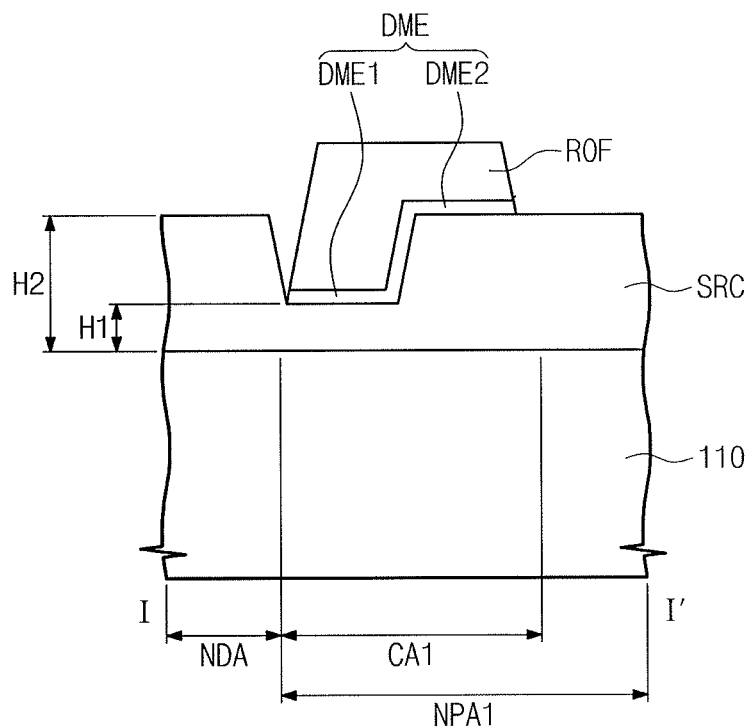
FIGS. 12A, 12B, 12C, and 12D illustrate views showing a second electrode, a dummy electrode, and a roof layer, which are disposed on a substrate.

As shown in FIG. 12A, the first dummy electrode DME1 of the dummy electrode DME may be upwardly spaced apart from the substrate 110 by the first height H1, and the second dummy electrode DME2 of the dummy electrode DME may be upwardly spaced apart from the substrate 110 by the second height H2.

One end of the first dummy electrode DME1 may be formed to be adjacent to the non-display area NDA in the first direction D1 and the other end of the first dummy electrode DME1 may be formed to be connected to the second dummy electrode DME2 in the first direction D1.

Figure 12B:
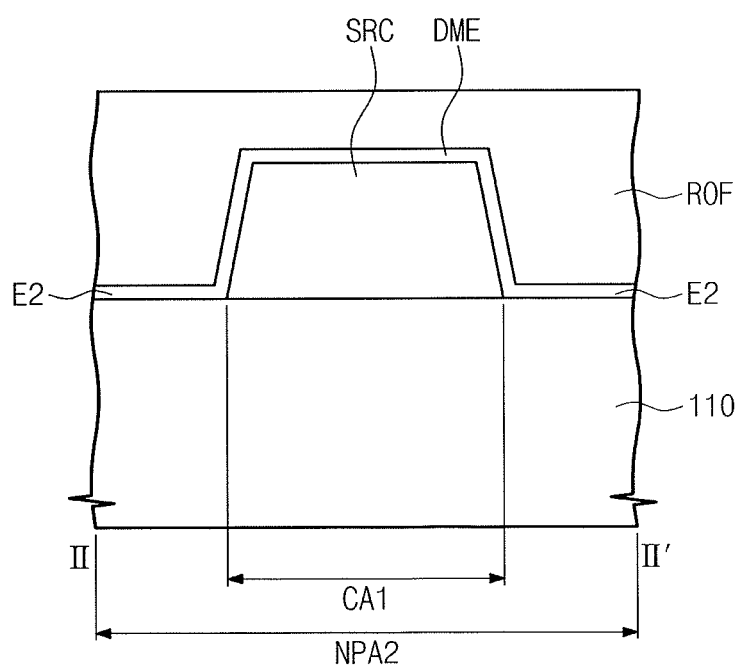
Figure 12C:
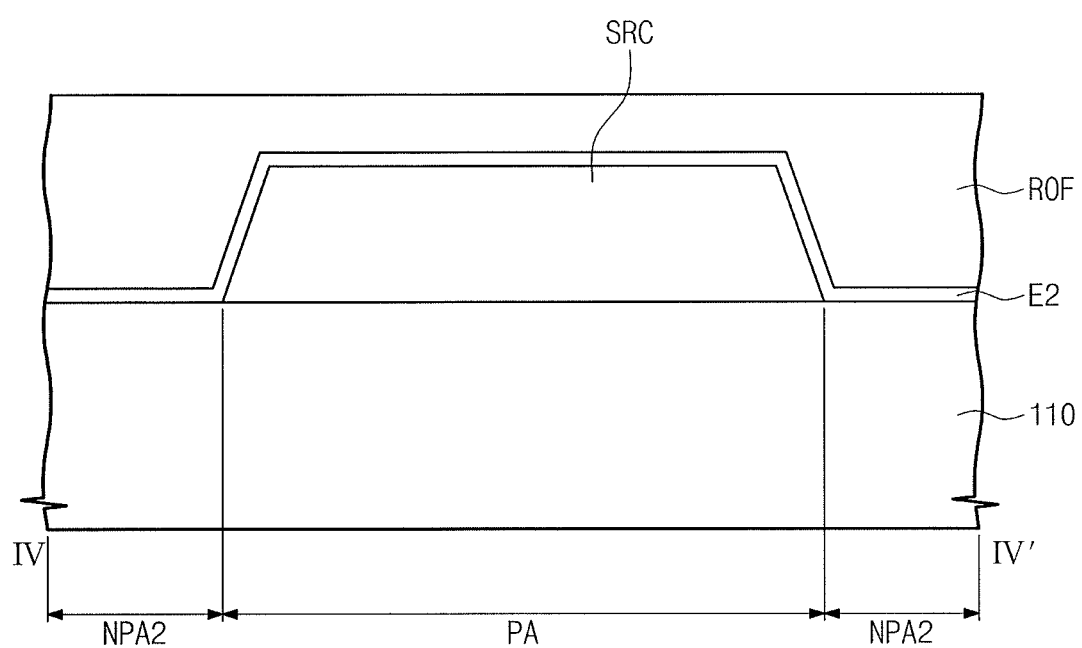
Figure 12D:
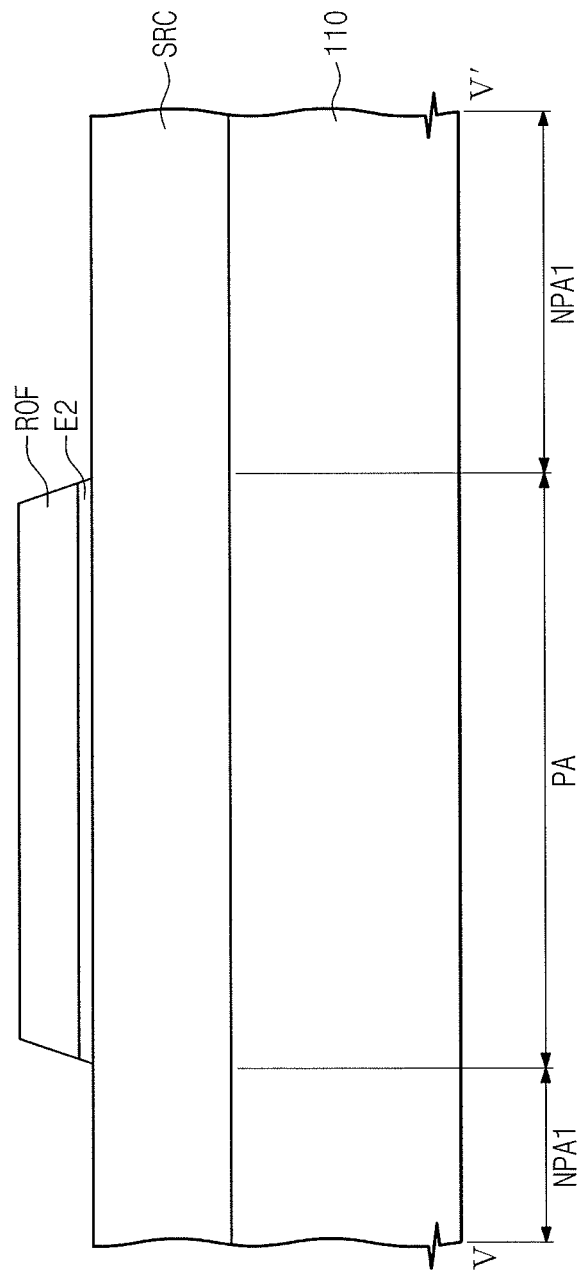

As shown in FIG. 12B, the dummy electrode DME may be disposed between the second electrodes E2 in the second non-pixel area NPA2 adjacent to the non-display area NDA and connected to the second electrodes E2.

The roof layer ROF may be formed on the second electrodes E2 and may extend in the second direction D2 to cover the upper surface of the second electrode E2. In addition, the roof layer ROF may be formed on the dummy electrode DME to cover the upper surface of the dummy electrode DME. The roof layer ROF may planarize the upper portion of the second electrode E2 and the dummy electrode DME.

The upper surface of the sacrificial layer SRC may be exposed in the areas in which the second electrode E2, the dummy electrode DME, and the roof layer ROF are not formed.

FIGS. 13A, 13B, 13C, and 13D illustrate views showing the substrate in which the first tunnel-shaped cavity and the dummy tunnel-shaped cavity are formed.

Figure 13A:
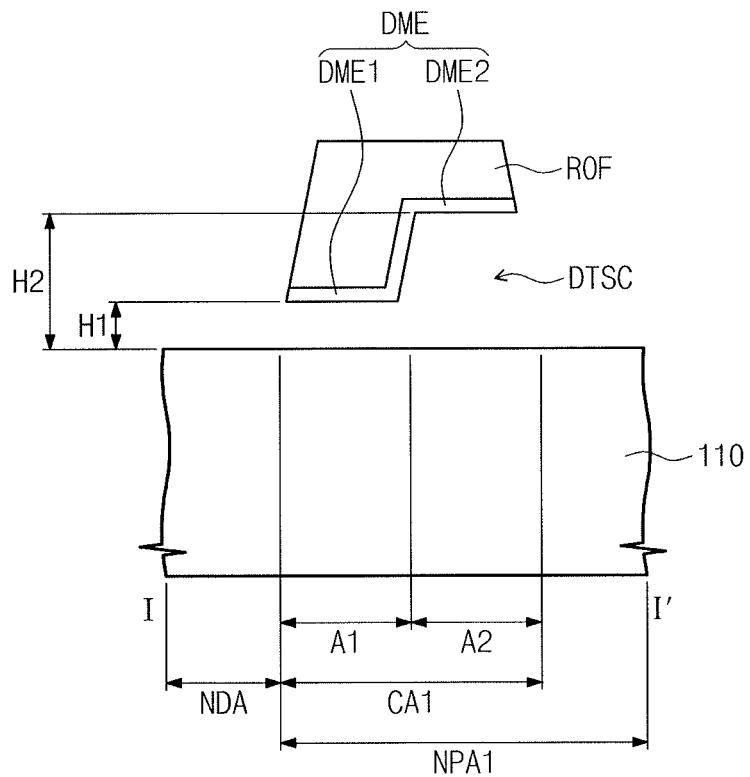
FIGS. 13A, 13B, 13C, and 13D illustrate views showing a substrate in which a first tunnel-shaped cavity and a dummy tunnel-shaped cavity are formed.
Figure 13B:
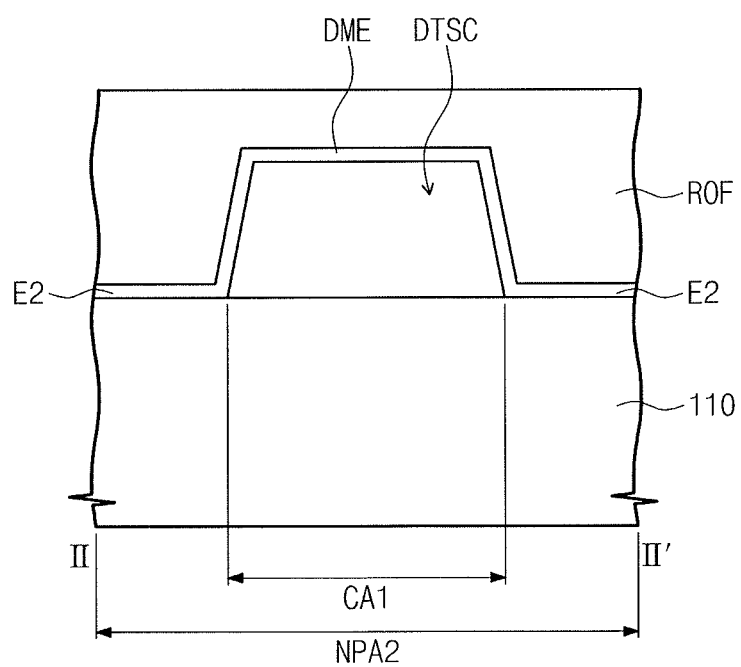

Referring to FIGS. 13A to 13D, the sacrificial layer SRC may be removed by a wet etching process. As shown in FIGS. 13A and 13B, the dummy tunnel-shaped cavity DTSC may be formed between the substrate 110 and the dummy electrode DME in the first cross area CA1. The both ends of the dummy tunnel-shaped cavity DTSC may be opened in the first direction D1.

The dummy tunnel-shaped cavity DTSC may include the first area A1 formed between the first dummy electrode DME and the substrate 110 and the second area A2 formed between the second dummy electrode DME2 and the substrate 110.

Figure 13C:
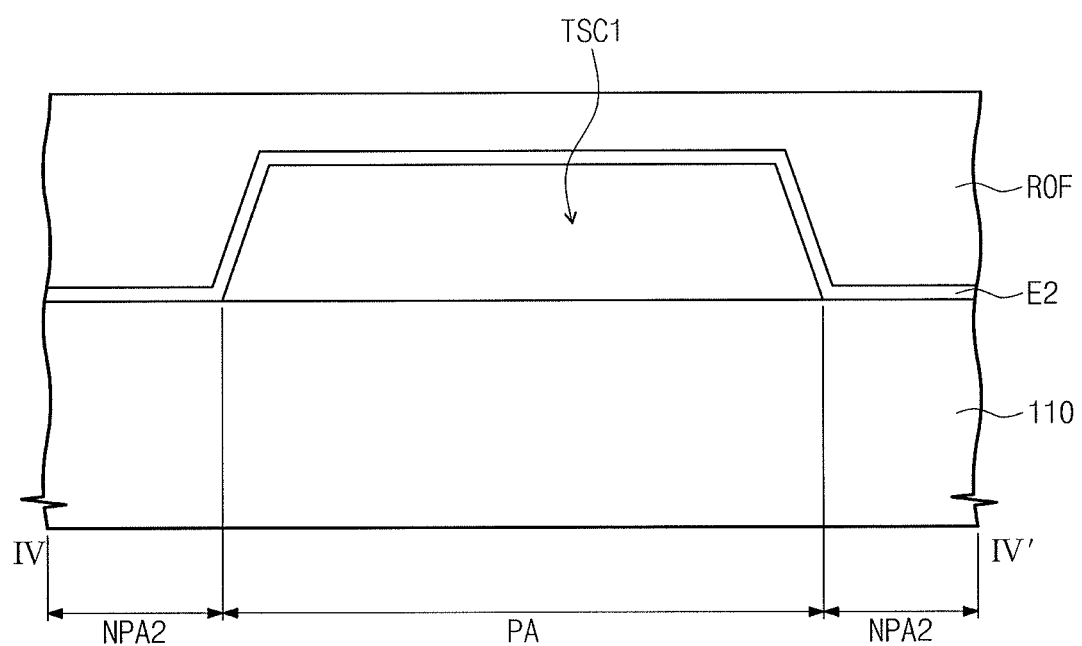
Figure 13D:
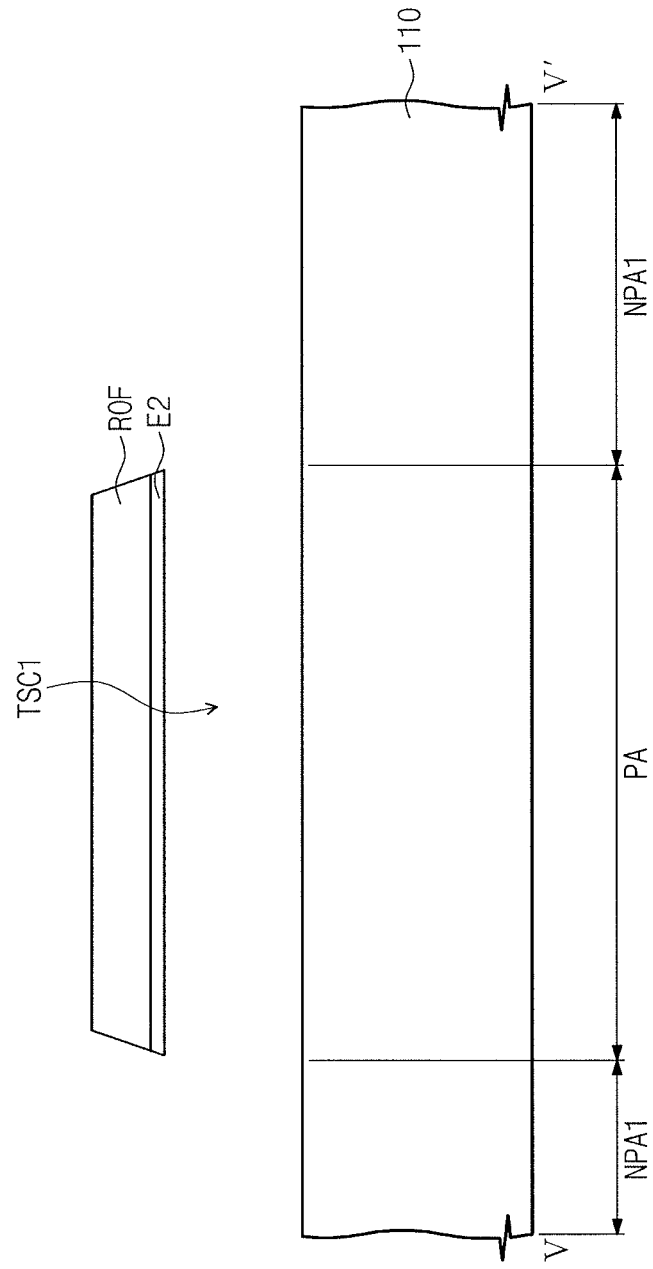
Figure 14A:
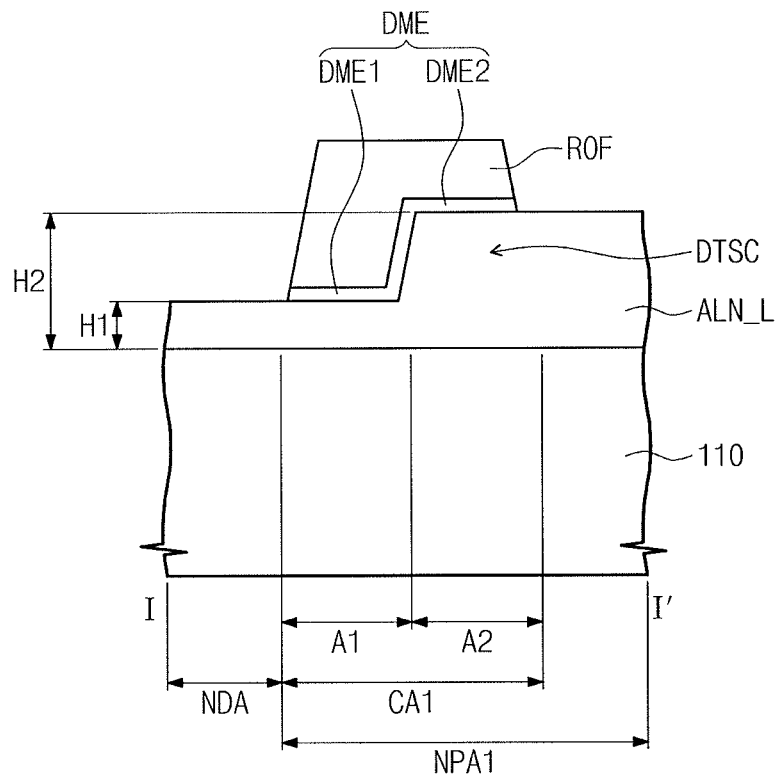
FIGS. 14A, 14B, 14C, and 14D illustrate views an alignment liquid provided on a substrate.
Figure 14B:
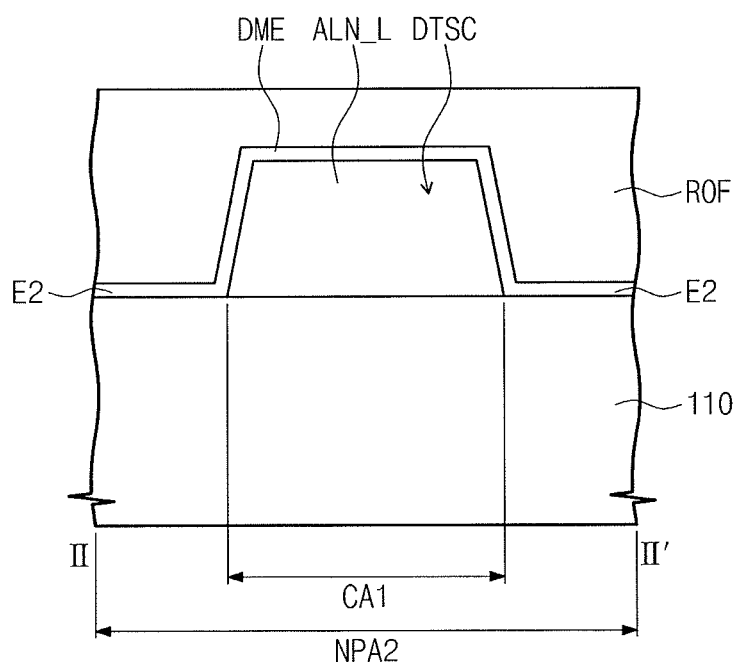
Figure 14C:
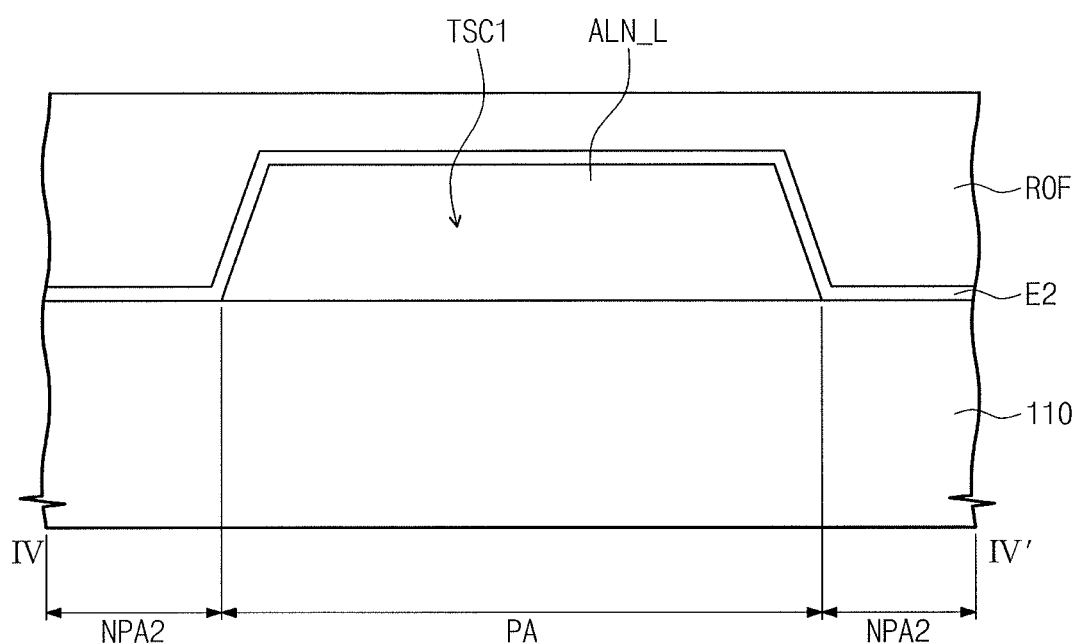
Figure 14D:
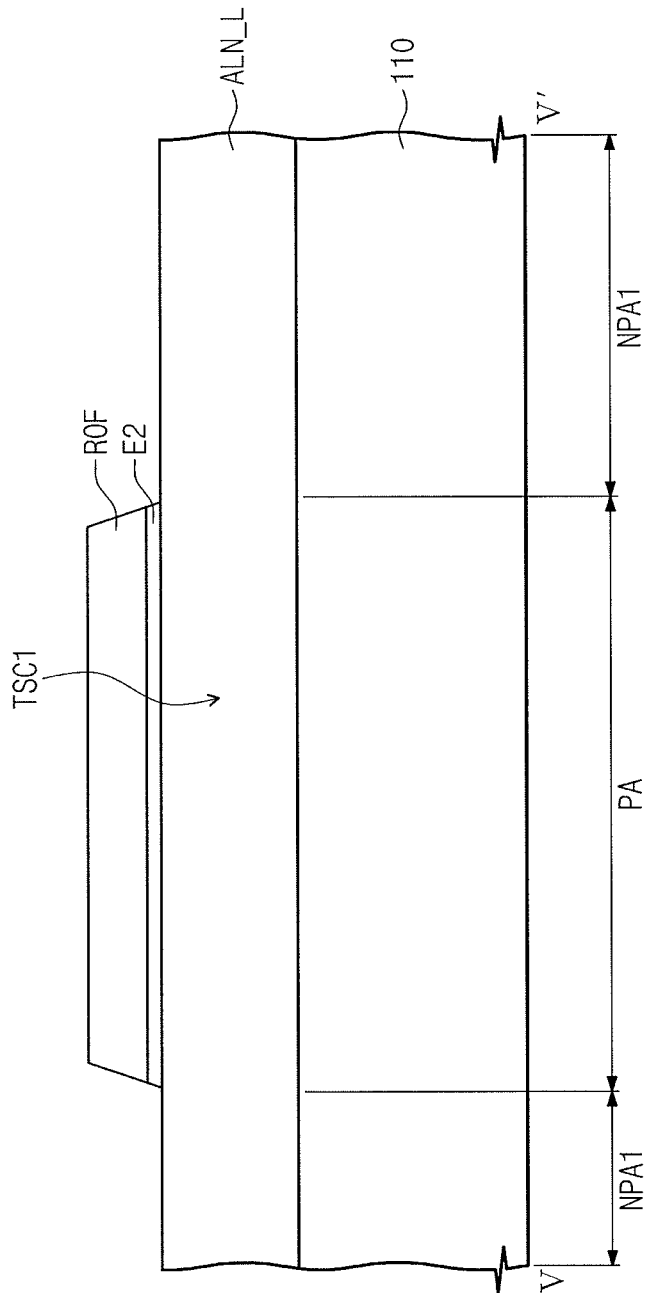

As shown in FIGS. 13C and 13D, the first tunnel-shaped cavity TSC1 may be formed between the first substrate 110 and the second electrode E2 in the pixel area PA. The both ends of the first tunnel-shaped cavity TSC1 may be opened in the second direction D2.

FIGS. 14A, 14B, 14C, and 14D illustrate views illustrating the alignment liquid provided on the substrate.

Referring to FIGS. 14A to 14D, the alignment liquid ALN_L may be provided on the substrate 110. The alignment liquid ALN_L may be provided to fill the first tunnel-shaped cavity TSC1 and the dummy tunnel-shaped cavity DTSC.

The alignment liquid ALN_L may be provided to fill the second tunnel-shaped cavity TSC2. The alignment liquid ALN_L may include polyimide (PI).

FIGS. 15A, 15B, 15C, 15D, and 15E illustrate views showing a method of forming the alignment layer on the substrate.

Figure 15A:
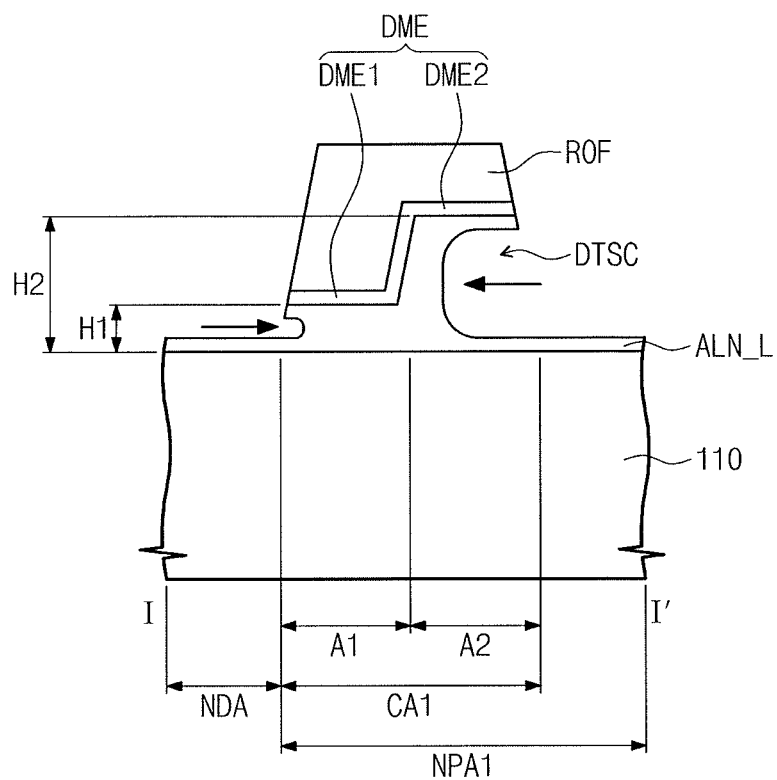
FIGS. 15A, 15B, 15C, 15D, and 15E illustrate views showing a method of forming an alignment layer on a substrate.
Figure 15B:
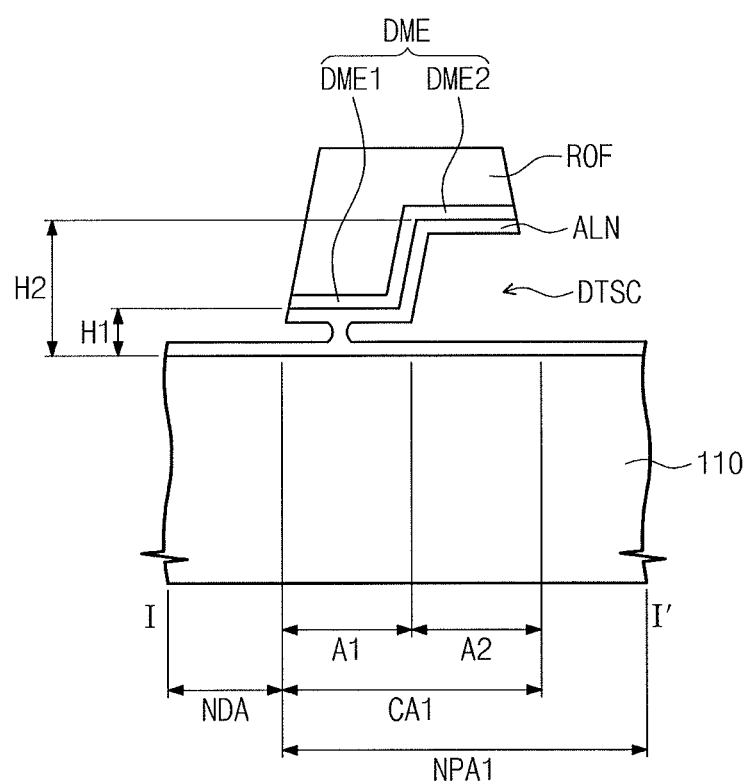
Figure 15C:
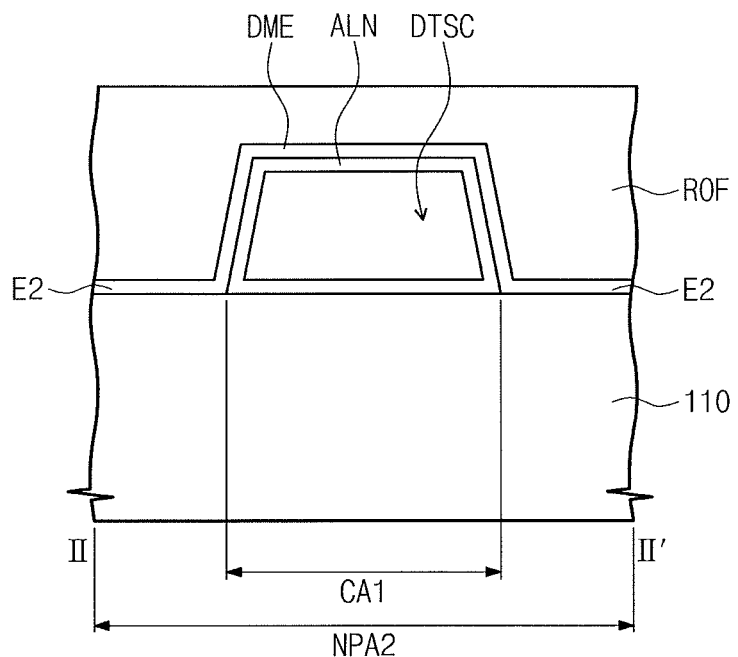

Referring to FIGS. 15A, 15B, and 15C, the alignment liquid ALN_L provided on the substrate 110 may be dried, and thus, the alignment layer ALN may be formed on the inner surface of the dummy electrode DME and on the substrate 110 in the dummy tunnel-shaped cavity DTSC. In addition, the alignment liquid ALN_L may be dried in the non-display area NDA in which the second electrode E2 is not formed such that the alignment layer ALN may be formed on the substrate 110.

The drying speed of the alignment liquid ALN_L in the dummy tunnel-shaped cavity DTSC may be proportional to the size of the dummy tunnel-shaped cavity DTSC. As described above, the dummy tunnel-shaped cavity DTSC may include the first area A1 with the first height H1 with respect to the substrate 110 and the second area A2 with the second height H2 higher than the first height H1 with respect to the substrate 110. As shown in FIG. 15A, the drying speed of the alignment liquid ALN_L may be slower in the first area A1 than that in the second area A2.

The alignment liquid ALN_L may be relatively fast to dry in the second area A2 and relatively slow to dry in the first area A1. In this case, both ends of the alignment liquid ALN_L may start to dry first and the alignment liquid ALN_L may become lumped together due to the difference in drying speed thereof. The alignment layer ALN may be formed to seal the dummy tunnel-shaped cavity DTSC in a predetermined area of the first area A1, as shown in FIG. 15B.

Figure 15D:
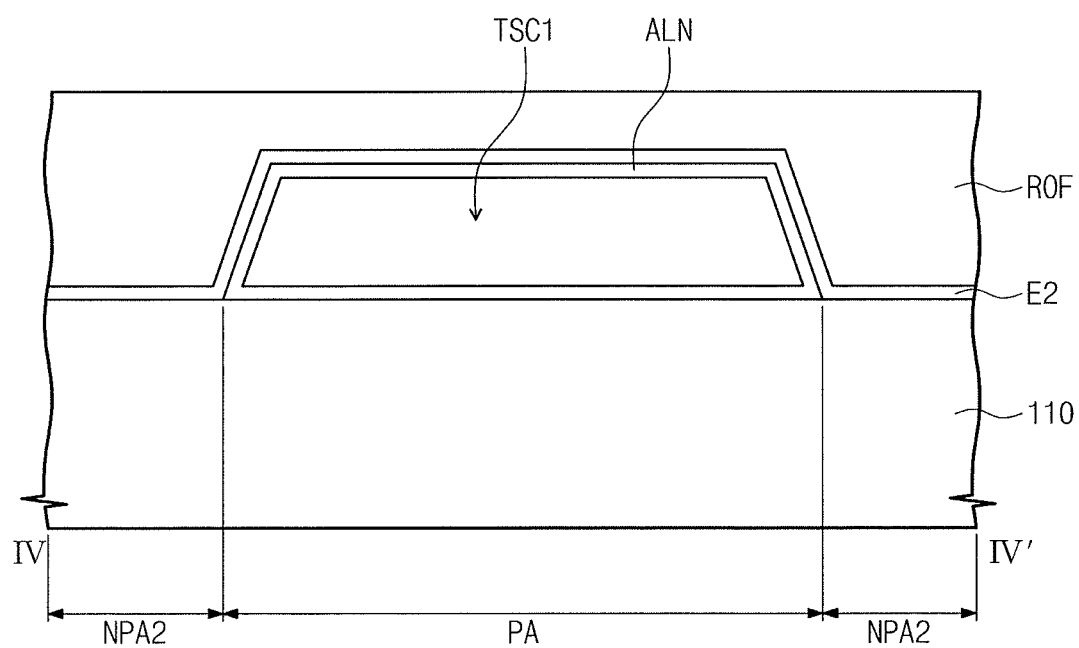
Figure 15E:
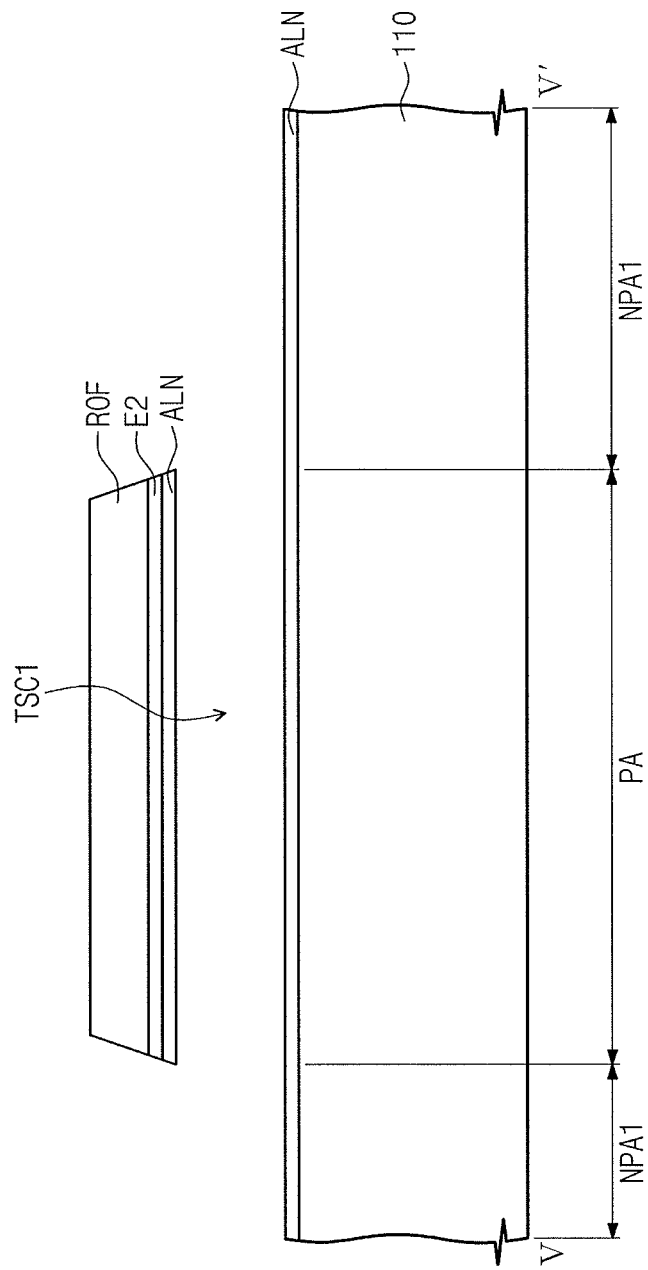
Figure 16A:
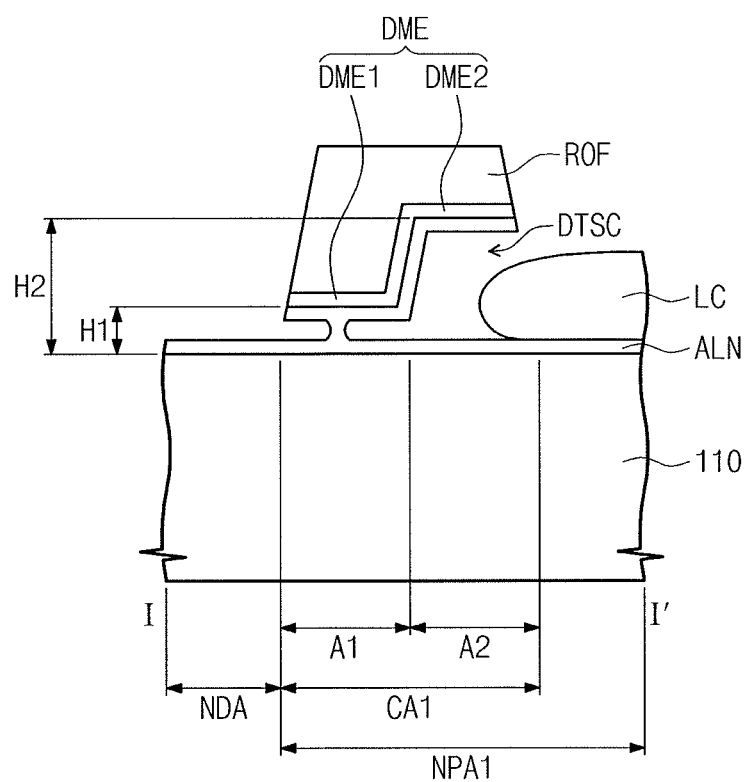
Figure 16B:
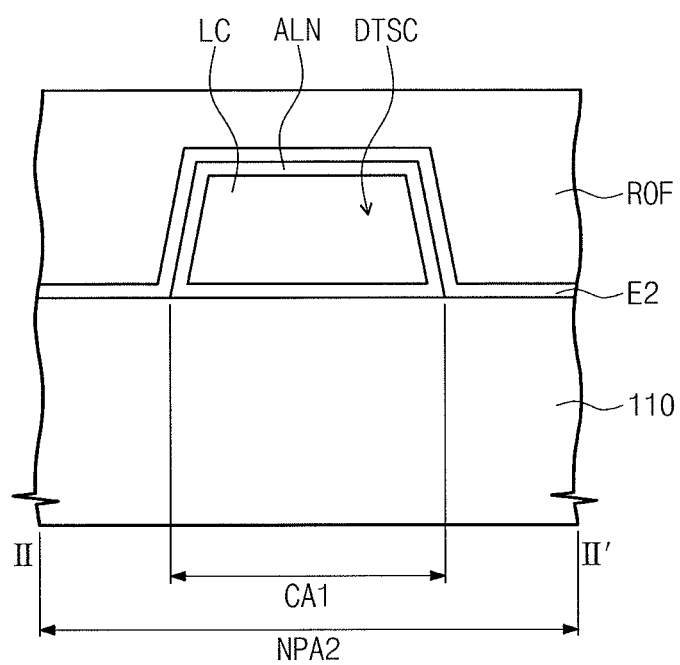
Figure 16C:
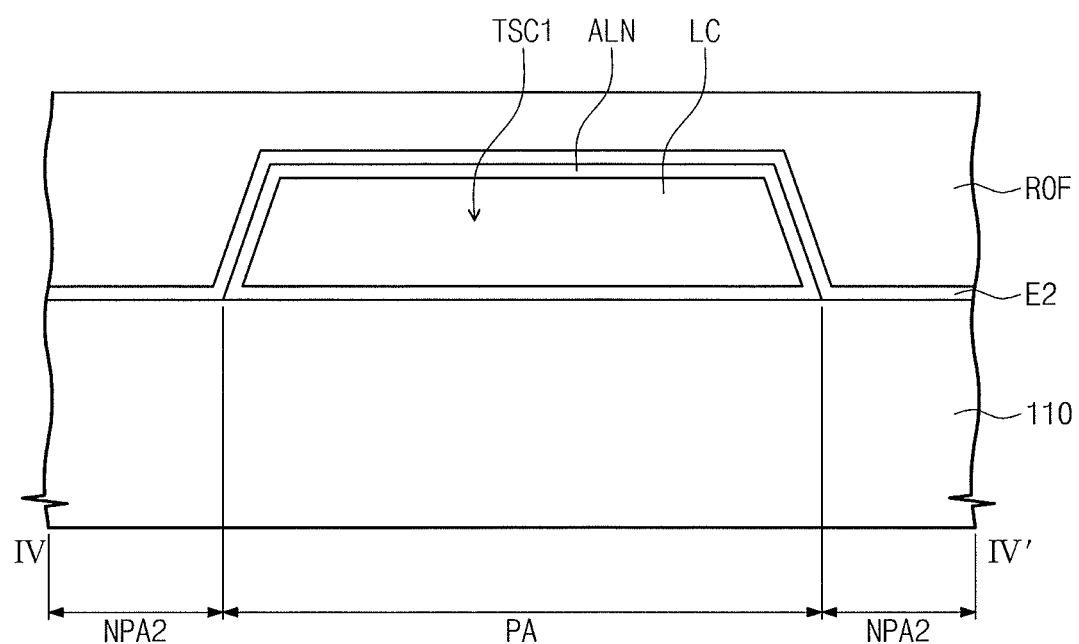
Figure 17A:
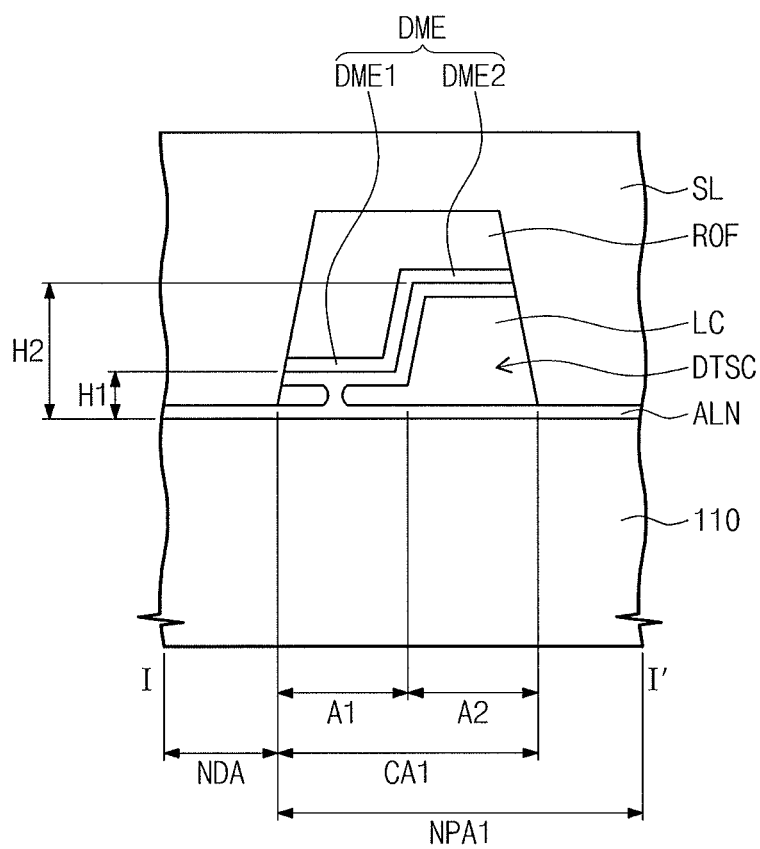
FIGS. 17A, 17B, 17C, and 17D illustrate views showing a sealing layer disposed on a substrate.
Figure 17B:
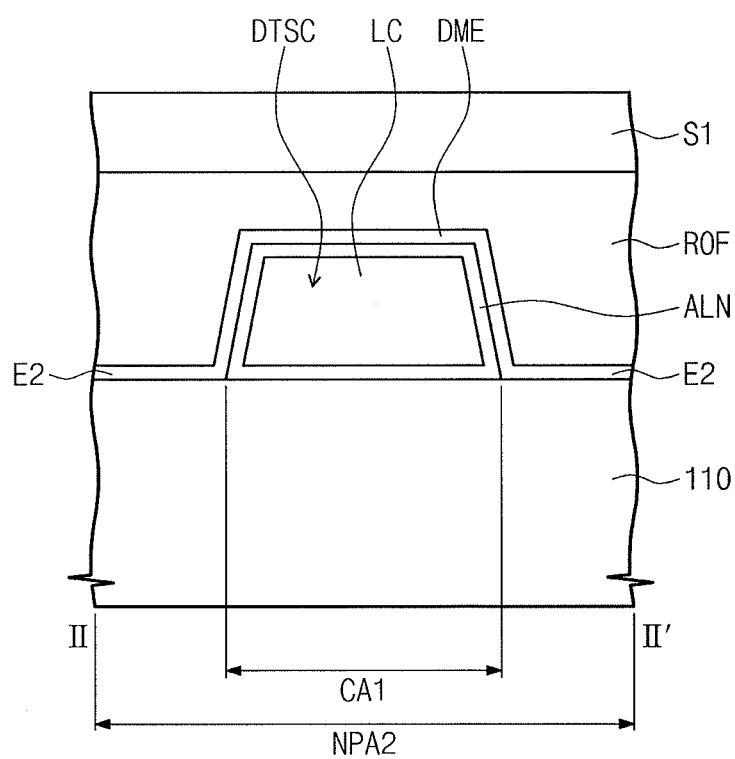
Figure 17C:
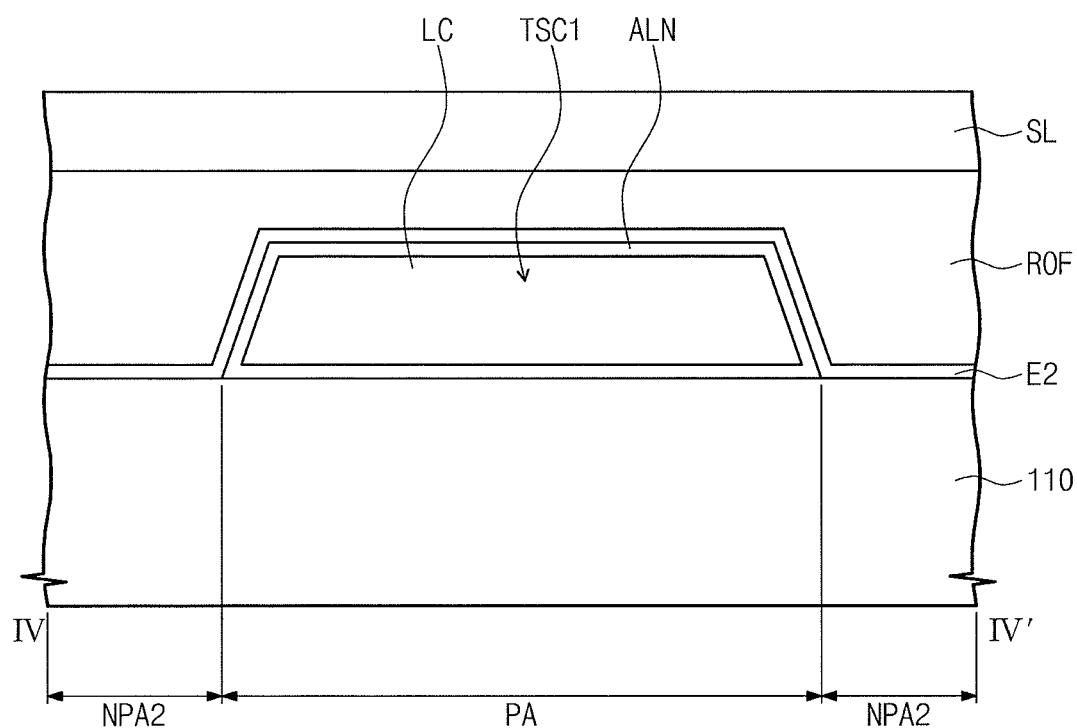
Figure 17D:
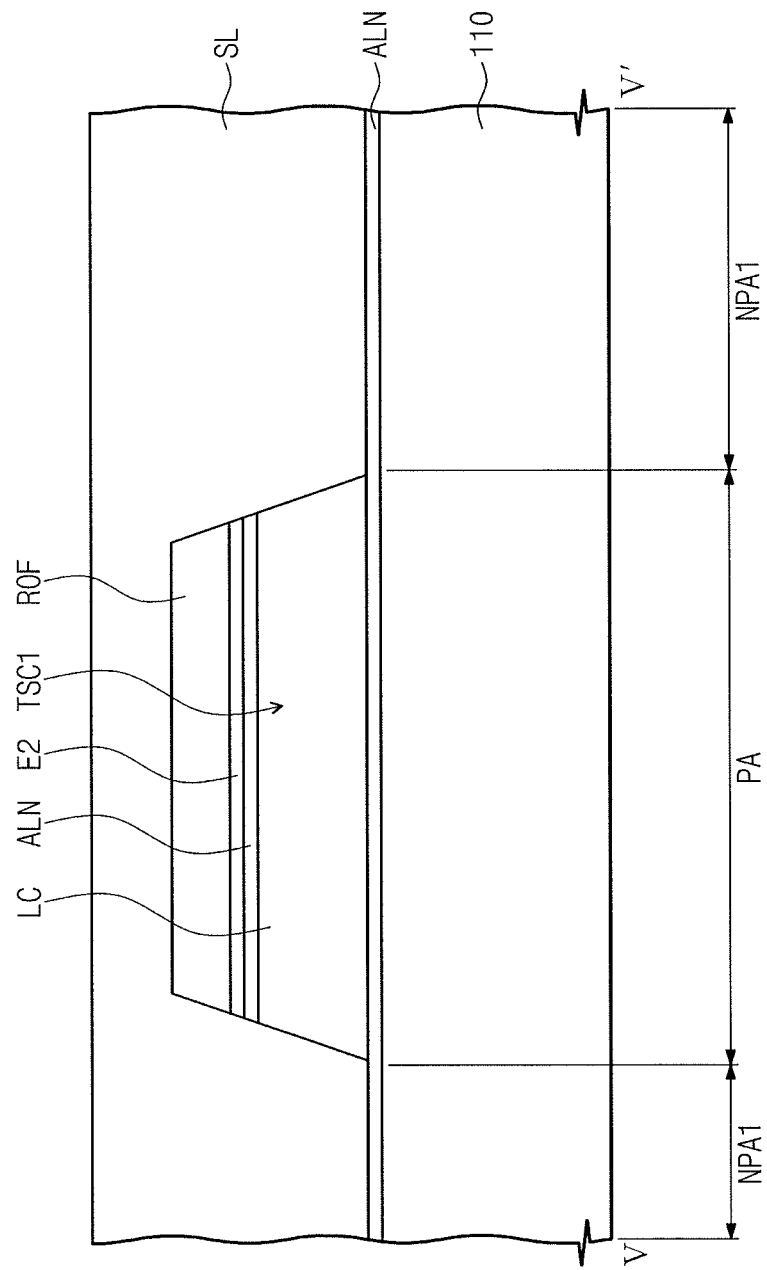

Referring to FIGS. 15C and 15D, when the alignment liquid ALN_L provided on the substrate 110 is dried, the alignment layer ALN may be formed on the substrate 110 to cover the first electrode E1 in the pixel area PA. In addition, the alignment layer ALN may be formed on the inner surface of the second electrode E2 in the first tunnel-shaped cavity TSC1. The alignment layer ALN may be formed on the substrate 110 in the first non-pixel area NPA1 of the display area DA.

The alignment layer ALN may be formed on the inner surface of the second electrode E2 in the second tunnel-shaped cavity TSC2 and formed on the substrate 110 in the dummy pixel area DPA to cover the first electrode E1.

In the present exemplary embodiment, the alignment liquid ALN_L may be provided to the second tunnel-shaped cavities TSC2 defined in the dummy pixel areas DPA of the non-display area NDA. In this case, the density of the solvent particles evaporated from the alignment liquid ALN_L may gradually increase in the atmosphere over the dummy pixel areas DPA, and then may becomes saturate in the atmosphere over the pixel areas PA in the display area DA. Thus, the density of the solvent particles in the atmosphere over the pixel areas PA may be uniform.

When the density of the solvent particles in the atmosphere over the pixel areas PA becomes uniform, the drying speed of the alignment liquid ALN_L provided to the first tunnel-shaped cavities TSC1 of the pixel area PA may be constant. As a result, the alignment layer ALN having the uniform thickness may be formed in the first tunnel-shaped cavities TSC1.

FIGS. 16A, 16B, 16C, and 16D illustrate views showing a method of forming the liquid crystal layer in the first tunnel-shaped cavity.

Referring to FIGS. 16A to 16D, the liquid crystal in fluid state may be provided on the substrate 110 of the first non-pixel area NPA1 adjacent to the first tunnel-shaped cavity TSC1 in order to form the liquid crystal layer LC. The liquid crystal is not provided to the first non-pixel area NPA1 adjacent to the upper and lower boundaries of the display area DA. The liquid crystal may be provided to the first non-pixel areas NPA1 except for the first non-pixel area NPA1 adjacent to the upper and lower boundaries of the display area DA.

The roof layer ROF may extend in the first direction D1 in the display area DA and may be formed on the second electrode E2. In addition, the upper portion of the roof layer ROF may be planarized. The alignment layer ALN may be formed on the first substrate 110 in the first non-pixel area NPA1 in which the roof layer ROF is not formed. Accordingly, the upper surface of the alignment layer ALN may be located at a position lower than that of the roof layer ROF in the first non-display area NPA1. As a result, the first non-display area NPA1 may have a trench or recess shape extending in the first direction D1 by the roof layer ROF.

The liquid crystal in fluid state may be provided on the substrate 110 of the first non-pixel area NPA1 formed in the trench shape by using an inkjet with a micro-pipette. The liquid crystal may move to the first tunnel-shaped cavity TSC1 by the capillary phenomenon while flowing through the first non-pixel area NPA1. Accordingly, the liquid crystal layer LC may be formed in the first tunnel-shaped cavity TSC1.

The liquid crystal may be provided to the pixel areas PA displaying the image and may not be provided to the dummy pixel areas DPA. The first area A1 of the dummy tunnel-shaped cavity DTSC disposed in the first cross area CA1 may be sealed by the alignment layer ALN. Therefore, the liquid crystal may be blocked in the first area A1 of the dummy tunnel-shaped cavity DTSC, and thus the liquid crystal may not move to the non-display area NDA.

After the liquid crystal layer LC is formed in the first tunnel-shaped cavity TSC1, the liquid crystal that remains in the first non-pixel area NPA1 may be removed by an aqueous solution. For instance, the aqueous solution may be provided to the first non-pixel area NPA1 having the trench shape extending in the first direction D1 to remove the liquid crystal remaining in the non-pixel area NPA1.

FIGS. 17A, 17B, 17C, and 17D illustrate views showing the sealing layer disposed on the substrate.

Referring to FIGS. 17A to 17D, the sealing layer SL may be formed on the roof layer ROF. The sealing layer SL may cover the substrate 110 and may block the both open ends of the dummy tunnel-shaped cavity DTSC to seal the dummy tunnel-shaped cavity DTSC. In addition, the sealing layer SL may cover the substrate 110 and blocks the both open ends of the first tunnel-shaped cavity TSC1 to seal the first tunnel-shaped cavity TSC1.

Consequently, the display apparatus 500 according to the present exemplary embodiment may include the uniform alignment layer and may prevent the liquid crystal from flowing into the non-display area NDA.

By way of summation and review, when the display device is manufactured, a spacer is formed on one of the two substrates to maintain a distance between the two substrates. The spacer is attached to the other of the two substrates using an adhesive. Due to the above-mentioned processes, a manufacturing process of the display device becomes complex and a manufacturing cost of the display device is increased.

Embodiments provide a display apparatus having a uniform alignment layer such that liquid crystals are prevented from flowing to a non-display area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A display apparatus, comprising:
    a substrate that includes a plurality of pixel areas, a display area including first and second non-pixel areas extending to cross each other, and a non-display area adjacent to the display area;
    a plurality of first electrodes on the substrate in the pixel areas;
    a plurality of second electrodes extending in a first direction and upwardly spaced apart from the substrate in the pixel areas to form first tunnel-shaped cavities;
    an image display area in each of the first tunnel-shaped cavities; and
    a plurality of dummy electrodes in first cross areas defined by an intersection of the first and second non-pixel areas adjacent to boundaries of the display area in the first direction, the dummy electrodes being upwardly spaced apart from the substrate in the first cross areas by a predetermined distance to form dummy tunnel-shaped cavities.

2. The display apparatus as claimed in claim 1, wherein:
    the first non-pixel area extends in the first direction,
    the second non-pixel area extends in a second direction crossing the first direction, and
    the dummy electrodes are between the second electrodes in the second non-pixel area adjacent to the non-display area and connected to the second electrodes.

3. The display apparatus as claimed in claim 1, wherein each of the dummy electrodes includes:
    a first dummy electrode adjacent to the non-display area and upwardly spaced apart from the substrate by a first height; and
    a second dummy electrode connected to the first dummy electrode and upwardly spaced apart from the substrate by a second height higher than the first height, one end of the first dummy electrode being adjacent to the non-display area in the first direction, and the other end of the first dummy electrode being connected to the second dummy electrode.

4. The display apparatus as claimed in claim 3, wherein each of the dummy tunnel-shaped cavities includes:
    a first area between the first dummy electrode and the substrate; and
    a second area between the second dummy electrode and the substrate.

5. The display apparatus as claimed in claim 4, further comprising an alignment layer on an inner surface of the first and second dummy electrodes and on the substrate in the dummy tunnel-shaped cavities, the alignment layer sealing the dummy tunnel-shaped cavity of the first area.

6. The display apparatus as claimed in claim 1, wherein:
    the non-display area includes a plurality of dummy pixel areas, and
    the second electrodes extend in the non-display area and are upwardly spaced apart from the substrate by a predetermined distance in the dummy pixel areas to form second tunnel-shaped cavities.

7. The display apparatus as claimed in claim 6, further comprising an alignment layer on an inner surface of the second electrodes and on the substrate to cover the first electrodes in the first tunnel-shaped cavities, and on the inner surface of the second electrodes and on the substrate in the second tunnel-shaped cavities.

8. The display apparatus as claimed in claim 6, further comprising:
   a roof layer on the second electrodes and the dummy electrodes, the roof layer being planarized; and
   a sealing layer on the roof layer and covering the substrate, the sealing layer sealing the first tunnel-shaped cavities, the dummy tunnel-shaped cavities, and the second tunnel-shaped cavities.

9. The display apparatus as claimed in claim 1, wherein the substrate in the display area includes:
   a thin film transistor connected to the first electrode;
   a color filter in each of the pixel areas; and
   a black matrix in the first and second non-pixel areas.

10. The display apparatus as claimed in claim 1, wherein the substrate in the non-display area includes a black matrix.

11. The display apparatus as claimed in claim 1, wherein the image display layer is a liquid crystal layer.

12. A method of manufacturing a display apparatus, the method comprising:
   preparing a substrate that includes a display area including a plurality of pixel areas, and first and second non-pixel areas that respectively extend in a first direction and a second direction to cross each other, and a non-display area disposed adjacent to the display area, the non-display are including a plurality of dummy pixel areas;
   forming a plurality of first electrodes on the substrate in the pixel areas;
   forming a sacrificial layer that extends in the second direction crossing the first direction to overlap with the pixel areas and the dummy pixel areas, in first cross areas of the first and second non-pixel areas adjacent to boundaries of the display area in the first direction;
   forming a plurality of second electrodes extending in the first direction to cover the sacrificial layer in the pixel areas and the dummy pixel areas;
   forming a plurality of dummy electrodes on the sacrificial layer in the first cross areas;
   forming a roof layer on the second electrodes and the dummy electrodes;
   wet-etching the sacrificial layer to form first tunnel-shaped cavities between the second electrode and the substrate in the pixel areas, to form dummy tunnel-shaped cavities between the dummy electrode and the substrate, and to form second tunnel-shaped cavities between the second electrode and the substrate in the dummy pixel areas; and
   providing a liquid crystal layer in the first tunnel-shaped cavities.

13. The method as claimed in claim 12, wherein the first non-pixel area extends in the first direction, the second non-pixel area extends in a second direction crossing the first direction, and the dummy electrodes are disposed between the second electrodes in the second non-pixel area adjacent to the non-display area and connected to the second electrodes.

14. The method as claimed in claim 12, further comprising:
   providing an alignment liquid to the first and second tunnel-shaped cavities on the substrate; and
   drying the alignment liquid to form an alignment layer in the first and second tunnel-shaped cavities.

15. The method as claimed in claim 12, wherein each of the dummy electrodes includes:
   a first dummy electrode disposed adjacent to the non-display area and upwardly spaced apart from the substrate with a first height; and
   a second dummy electrode connected to the first dummy electrode and upwardly spaced apart from the substrate with a second height higher than the first height, one end of the first dummy electrode being disposed adjacent to the non-display area in the first direction, and the other end of the first dummy electrode being connected to the second dummy electrode.

16. The method as claimed in claim 15, wherein each of the dummy tunnel-shaped cavities includes:
   a first area disposed between the first dummy electrode and the substrate; and
   a second area disposed between the second dummy electrode and the substrate.

17. The method as claimed in claim 16, further comprising:
   providing an alignment liquid to the first dummy tunnel-shaped cavities; and
   drying the alignment liquid to form an alignment layer in the first dummy tunnel-shaped cavities, wherein the alignment layer is lumped together to seal the first dummy tunnel-shaped cavity of each of the first areas.

18. The method as claimed in claim 17, further comprising:
   forming a roof layer on the second electrodes and the dummy electrodes; and
   forming a sealing layer on the roof layer to cover the substrate and to seal the first tunnel-shaped cavities, the dummy tunnel-shaped cavities, and the second tunnel-shaped cavities.

19. The method as claimed in claim 12, wherein forming the liquid crystal layer includes:
   providing a liquid crystal in fluid state to the first non-pixel area;
   providing the liquid crystal to the first tunnel-shaped cavities using a capillary phenomenon; and
   removing the liquid crystal from the first non-pixel area.

20. The method as claimed in claim 12, wherein the substrate includes:
   a thin film transistor connected to the first electrode;
   a color filter disposed in each of the pixel areas; and
   a black matrix disposed in the first and second non-pixel areas and the non-display area.

* * * * *